United States Patent
Tsukagoshi

(10) Patent No.: US 11,483,565 B2
(45) Date of Patent: Oct. 25, 2022

(54) RECEIVING APPARATUS, RECEIVING METHOD, TRANSMITTING APPARATUS, AND TRANSMITTING METHOD

(71) Applicant: SATURN LICENSING LLC, New York, NY (US)

(72) Inventor: Ikuo Tsukagoshi, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 17/264,994

(22) PCT Filed: Jul. 29, 2019

(86) PCT No.: PCT/JP2019/029719
§ 371 (c)(1),
(2) Date: Feb. 1, 2021

(87) PCT Pub. No.: WO2020/031782
PCT Pub. Date: Feb. 13, 2020

(65) Prior Publication Data
US 2021/0329247 A1   Oct. 21, 2021

(30) Foreign Application Priority Data
Aug. 10, 2018   (JP) .............................. JP2018-152086

(51) Int. Cl.
*H04N 19/85*   (2014.01)
*H04N 19/132*   (2014.01)
(Continued)

(52) U.S. Cl.
CPC ......... *H04N 19/132* (2014.11); *H04N 19/172* (2014.11); *H04N 19/31* (2014.11); *H04N 19/85* (2014.11)

(58) Field of Classification Search
CPC .... H04N 19/132; H04N 19/172; H04N 19/31; H04N 19/85
See application file for complete search history.

(56) References Cited

U.S. PATENT DOCUMENTS

| 2016/0234500 A1* | 8/2016 | Tsukagoshi | .......... H04N 19/132 |
| 2019/0116386 A1 | 4/2019 | Tsukagoshi | |
| 2021/0136421 A1* | 5/2021 | Fairhurst | ................ H04N 19/80 |

FOREIGN PATENT DOCUMENTS

| EP | 3051819 A1 | 8/2016 |
| EP | 3346710 A1 | 7/2018 |

(Continued)

OTHER PUBLICATIONS

International Search Report dated Aug. 27, 2019 in PCT/JP2019/029719 filed on Jul. 29, 2019, 1 page.

*Primary Examiner* — Hesham K Abouzahra
(74) *Attorney, Agent, or Firm* — Oblon, McClelland, Maier & Neustadt, L.L.P.

(57) ABSTRACT

It is made possible to reduce motion picture quality degradation caused by strobing in a layer of a basic frame frequency and to maintain a high image quality in layers of the other frame frequencies.
Image data in a plurality of frequency layers (only image data regarding a lowermost frequency layer is subjected to blending processing using image data regarding another frequency layer) obtained by hierarchically decomposing image data at a predetermined frame frequency is received. Image data for display is obtained according to a display capability, using image data regarding layers from the lowermost frequency layer up to a predetermined higher frequency layer. It is possible to reduce the motion picture quality degradation caused by the strobing in the layer of the basic frame frequency (frame frequency of the lowermost (Continued)

frequency layer) and to maintain the high image quality in the layers of the other frame frequencies.

16 Claims, 21 Drawing Sheets

(51) Int. Cl.
*H04N 19/172* (2014.01)
*H04N 19/31* (2014.01)

(56) References Cited

FOREIGN PATENT DOCUMENTS

| WO | WO 2015/076277 A1 | 5/2015 |
| WO | WO 2017/065128 A1 | 4/2017 |

\* cited by examiner

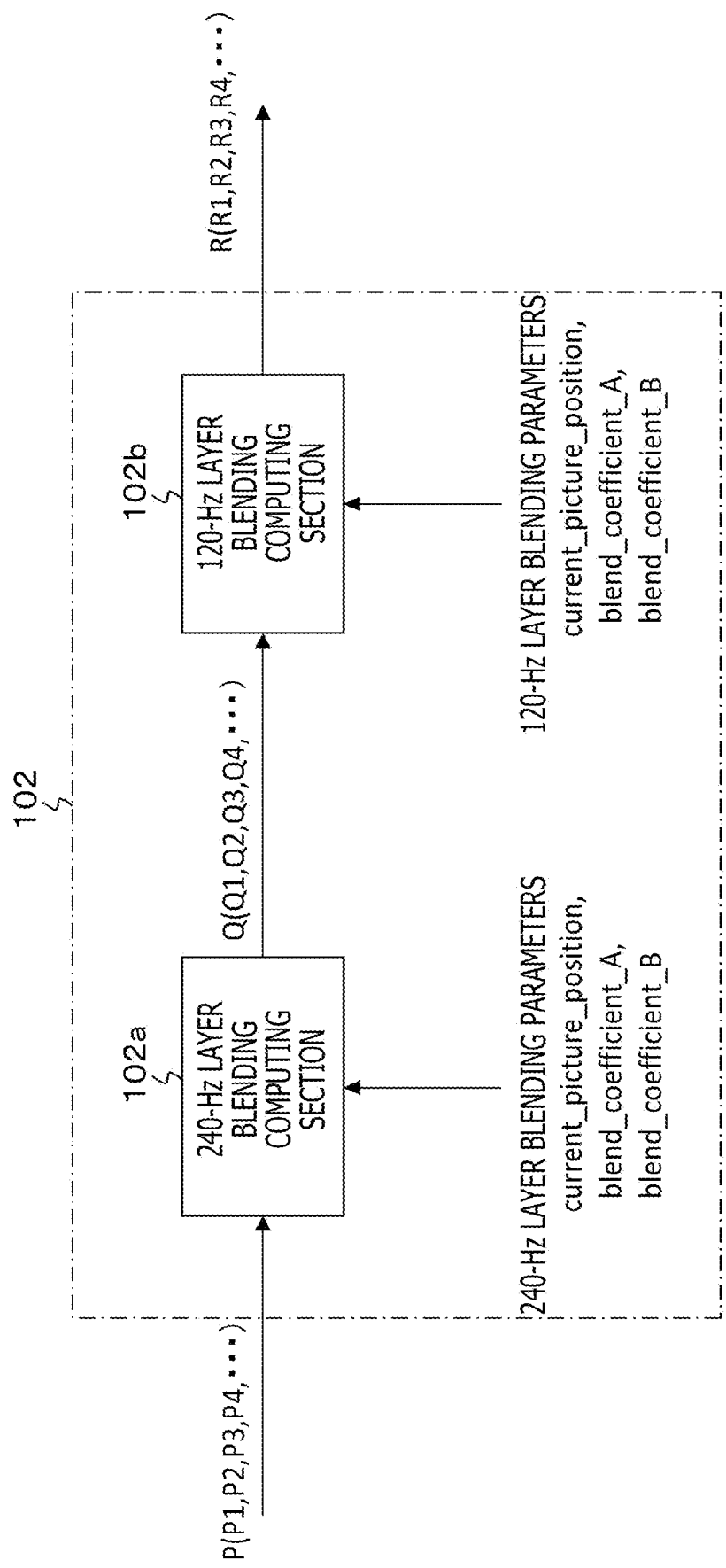

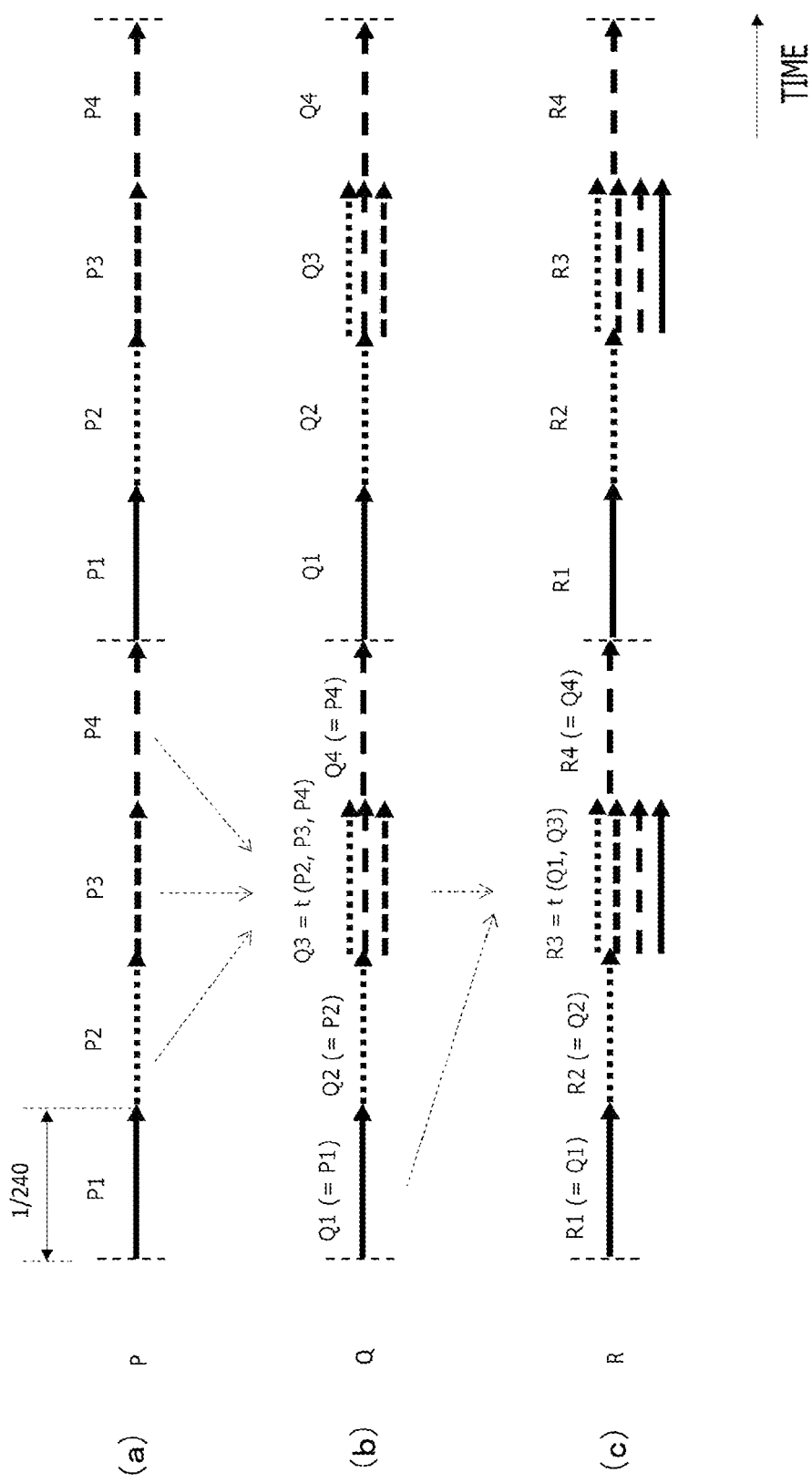

FIG.6

| Syntax | No. of Bits | Format |
|---|---|---|
| Blending_information ( ) { | | |
|    blending_information_id | | ue(v) |
|    number_of_blending_layers | 8 | uimsbf |
|    for( l = 0 ; l < number_of_blending_layers ; l++){ | | |
|       framerate_layer | 8 | uimsbf |
|       blend_flag | 1 | bslbf |
|       blend_target_flag | 1 | bslbf |
|       shutter_angle | 4 | uimsbf |
|       temporal_filter_taps_minus2 | 2 | uimsbf |
|       if ( (temporal_filter_taps_minus2 == 0) { | | |
|          current_picture_position | 2 | uimsbf |
|       } | | |
|       else if ( temporal_filter_taps == 1 ) { | | |
|          if ( blend_flag == 1 ) { | | |
|             current_picture_position = "11" | 2 | uimsbf |
|          } | | |
|          else { | | |
|             current_picture_position | 2 | uimsbf |
|          } | | |
|       } | | |
|       reserved | 6 | bslbf |
|       for ( j = 0 ; j < temporal_filter_taps_minus2 + 2 ; j++ ) { | | |
|          blend_coefficient_A | 8 | uimsbf |
|          blend_coefficient_B | 8 | uimsbf |
|       } | | |
|    } | | |
| } | | |

FIG. 7

| | |
|---|---|
| number_of_blending_layers | INDICATES NUMBER OF FREQUENCY LAYERS TO BE SUBJECTED TO BLENDING PROCESSING. |
| frame_rate_layer | INDICATES INTENDED FREQUENCY LAYER.<br>1: 50Hz,  2: 60Hz,  3: 100Hz,  4: 120Hz,  5: 200Hz,  6: 240Hz |
| blend_flag | INDICATES WHETHER OR NOT CONCERNED PICTURES ARE BEING BLENDED.<br>1: BLENDED    0: NOT BLENDED |
| blend_target_flag | INDICATES WHETHER OR NOT CONCERNED PICTURES ARE SUBJECTED TO BLENDING PROCESSING.<br>1: YES    0: NO |
| shutter_angle | INDICATES SHUTTER ANGLE (SHUTTER APERTURE RATIO RELATIVE TO FRAME PERIOD) OF INTENDED LAYER.<br>1: 360 degree (or 100%),  2: 270 degree (or 75%),  3: 180 degree (or 50%),<br>4: 90 degree (or 25%) |
| temporal_filter_taps_minus2 | INDICATES VALUE OBTAINED BY SUBTRACTING 2 FROM NUMBER OF PICTURES CONTRIBUTING TO BLENDING PROCESSING.<br>0: NUMBER OF PICTURES IS 2, 1: NUMBER OF PICTURES IS 3, 2: NUMBER OF PICTURES IS 4, 3: NUMBER OF PICTURES IS 5 |
| current_picture_position | INDICATES TEMPORAL ORDER OF CURRENT PICTURE IN PICTURES CONTRIBUTING TO BLENDING PROCESSING ("blend_target_flag" IS 1).<br>FOR temporal_filter_taps = 2,<br>(TEMPORALLY BEFORE) ← x   x → (TEMPORALLY AFTER)<br>                            1     1<br>FOR blend_flag = 1, VALUE OF current_picture_position IS "11." ALSO,<br>FOR blend_flag = 0, VALUE OF current_picture_position IS "01" OR "10."<br>                            (HIGHER IN TEMPORAL ORDER OUT OF TWO PICTURES: VALUE IS "10")<br>                            (LOWER IN TEMPORAL ORDER OUT OF TWO PICTURES: VALUE IS "01")<br>FOR temporal_filter_taps = 3,<br>(TEMPORALLY BEFORE) ← x   x   x → (TEMPORALLY AFTER)<br>                            1   1   1<br>                            (HIGHEST IN TEMPORAL ORDER AMONG THREE PICTURES: VALUE IS "10")<br>                            (MEDIAN IN TEMPORAL ORDER AMONG THREE PICTURES: VALUE IS "11")<br>                            (LOWEST IN TEMPORAL ORDER AMONG THREE PICTURES: VALUE IS "01") |
| blend_coefficient_A | INDICATES NUMERATOR OF BLENDING COMPUTING COEFFICIENT. |
| blend_coefficient_B | INDICATES DENOMINATOR OF BLENDING COMPUTING COEFFICIENT. |

NOTE THAT, IN ORDER BY for LOOP, INTENDED PICTURES ARE SEQUENTIALLY DISPOSED FROM OLDEST ONE.

FIG. 8

CASE OF ADDING BLENDING PROCESSING INFORMATION ONLY TO PICTURES IN 60-Hz LAYER (BLENDING PATTERN A)

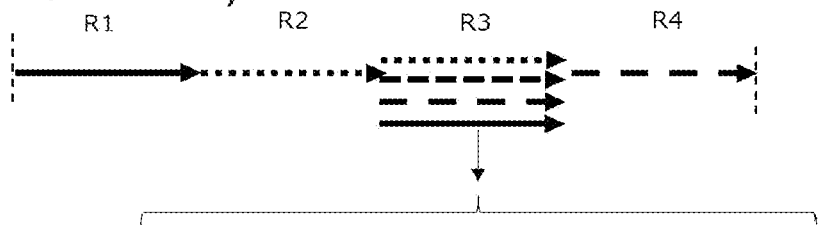

| | |
|---|---|
| framerate_layer | = 4 (120Hz) |
| blend_flag | = 1 |
| blend_target | = 1 |
| shutter_angle | = 1 |
| temporal_filter_taps_minus2 | = 0 |
| current_picture_position | = "01" |
| blend_coefficient_A | = 1 |
| blend_coefficient_B | = 5 |
| blend_coefficient_A | = 4 |
| blend_coefficient_B | = 5 |

| | |
|---|---|
| framerate_layer | = 6 (240Hz) |
| blend_flag | = 1 |
| blend_target | = 1 |
| shutter_angle | = 2 |
| temporal_filter_taps_minus2 | = 1 |
| current_picture_position | = "11" |
| blend_coefficient_A | = 1 |
| blend_coefficient_B | = 4 |
| blend_coefficient_A | = 1 |
| blend_coefficient_B | = 2 |
| blend_coefficient_A | = 1 |
| blend_coefficient_B | = 4 |

FIG. 9
CASE OF ADDING BLENDING PROCESSING INFORMATION ONLY TO PICTURES IN 60-Hz LAYER (BLENDING PATTERN B)

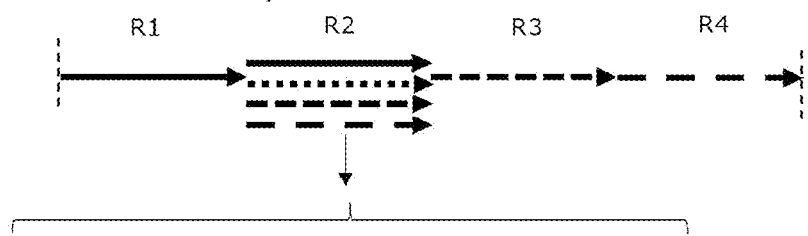

| framerate_layer | = 4 (120Hz) |
|---|---|
| blend_flag | = 1 |
| blend_target | = 1 |
| shutter_angle | = 1 |
| temporal_filter_taps_minus2 | = 0 |
| current_picture_position | = "10" |
| blend_coefficient_A | = 4 |
| blend_coefficient_B | = 5 |
| blend_coefficient_A | = 1 |
| blend_coefficient_B | = 5 |

| framerate_layer | = 6 (240Hz) |
|---|---|
| blend_flag | = 1 |
| blend_target | = 1 |
| shutter_angle | = 2 |
| temporal_filter_taps_minus2 | = 1 |
| current_picture_position | = "11" |
| blend_coefficient_A | = 1 |
| blend_coefficient_B | = 4 |
| blend_coefficient_A | = 1 |
| blend_coefficient_B | = 2 |
| blend_coefficient_A | = 1 |
| blend_coefficient_B | = 4 |

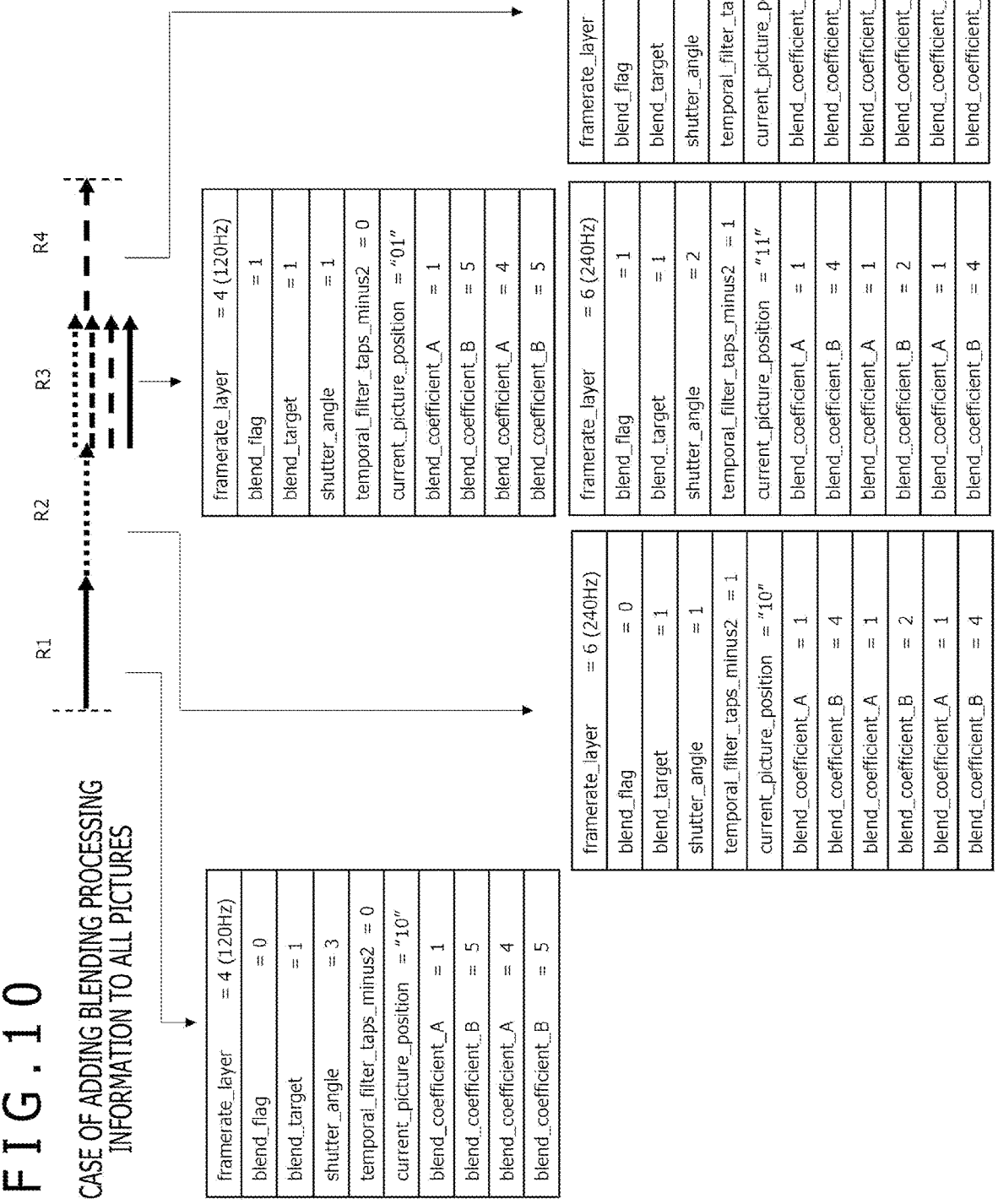
FIG. 10 CASE OF ADDING BLENDING PROCESSING INFORMATION TO ALL PICTURES CASE OF ADDING BLENDING PROCESSING INFORMATION ONLY TO PICTURES IN 60-Hz LAYER

FIG. 23

HDMI Blending_Information InfoFrame format

| address | elements | | |
|---|---|---|---|
| InfoFrameType Code | New InfoFrame Type | | |
| InfoFrame Version Number | Version = 0x01 | | |
| Length of blending_information InfoFrame | Length of blending information | | |
| N+0 | number_of_blending_layers | | |
| N+1 | framerate_layer | | |
| N+2 | blend_flag | blend_target_flag | |
| N+3 | current_picture_position | | |
| N+4 | Shutter_angle | reserved | temporal_filter_taps_minus2 |
| N+5 | Blend_coefficient_A | | |
| N+6 | Blend_coefficient_B | | |
| N+7 | Blend_coefficient_A | | |
| N+8 | Blend_coefficient_A | | |
| N+9 | Blend_coefficient_B | | |

RECEIVING APPARATUS, RECEIVING METHOD, TRANSMITTING APPARATUS, AND TRANSMITTING METHOD

TECHNICAL FIELD

The present technology relates to a receiving apparatus, a receiving method, a transmitting apparatus, and a transmitting method, and particularly, relates to a receiving apparatus, a receiving method, a transmitting apparatus, and a transmitting method for handling blending-processed image data.

BACKGROUND ART

In a case in which a receiver that performs decoding at a frame rate conventionally used in broadcasting receives a broadcast stream at a high frame rate and partially decodes the stream, motion continuity is impaired, and a motion picture quality degrades. It is said that a main cause of this motion picture quality degradation is strobing generated by intermittent projection of pictures on a retina in a human eye with respect to quick motions since the temporal continuity among the partially decoded pictures is impaired.

To reduce the motion picture quality degradation caused by the strobing, the present applicant has previously made a proposal of a technology for performing pixel blending among a picture and preceding and subsequent pictures of the former picture for pictures in a frame period as a reference (refer to PTL 1). In this case, even if a conventional receiver performs temporal sub-sampling, moving elements are reflected in a partially decoded temporal sub-sample; thus, the motion picture quality degradation caused by the strobing is reduced.

CITATION LIST

Patent Literature

[PTL 1]
International Publication WO 2015/076277

SUMMARY

Technical Problem

According to the conventional technology, all images at a ½ frequency of the highest frequency (for example, 240 Hz or higher) and all images at a ¼ frequency of the highest frequency are blended with images output at the highest frequency obtained by camera photographing; thus, at a time of reproducing the images at the ½ frequency, a high image quality at the time of camera photographing degrades.

To maintain a definition image quality for high frame rate broadcasting, a method based on transmission of moving images at a relatively small shutter angle by a short shutter and allowing the receiver that creates images for display from partial decoding to reduce the motion picture quality degradation caused by the strobing is desired.

An object of the present technology is to enable reduction in motion picture quality degradation caused by strobing in a layer of a basic frame frequency and to enable a high image quality to be maintained in a case of including layers of other frame frequencies.

Solution to Problem

A concept of the present technology lies in a receiving apparatus including a receiving section that receives image data regarding a plurality of frequency layers obtained by hierarchically decomposing image data at a predetermined frame frequency, in which only image data regarding a lowermost frequency layer among the image data regarding the plurality of frequency layers is subjected to blending processing using image data regarding another frequency layer, and the receiving apparatus further includes a processing section that obtains image data for display according to a display capability, using image data regarding layers from the lowermost frequency layer up to a predetermined higher frequency layer among the image data regarding the plurality of frequency layers.

According to the present technology, the receiving section receives the image data regarding the plurality of frequency layers obtained by hierarchically decomposing the image data at the predetermined frame frequency. Only the image data regarding the lowermost frequency layer among the image data regarding the plurality of frequency layers is subjected herein to blending processing using image data regarding another frequency layer. The lowermost frequency layer means herein a layer of a lower frequency group contained in a basic display frequency.

For example, the image data at the predetermined frame frequency may include image data having a shutter angle of 360°. Also, for example, the predetermined frame frequency may be four or more times higher than the frame frequency of the lowermost frequency layer, and the image data regarding the plurality of frequency layers may be obtained by hierarchically decomposing the image data at the predetermined frame frequency into three or more layers. In this case, for example, the predetermined frame frequency may include 240 Hz, the frame frequency of the lowermost frequency layer may include 60 Hz, and the image data regarding the plurality of frequency layers may contain image data in a 60-Hz layer, image data in a 120-Hz layer, and image data in a 240-Hz layer which are obtained by hierarchically decomposing the image data at the frame frequency of 240 Hz into three layers.

The processing section obtains image data for display according to a display capability, using image data regarding layers from the lowermost frequency layer up to a predetermined higher frequency layer among the image data regarding the plurality of frequency layers. For example, the processing section may perform de-blending processing on the image data regarding the lowermost frequency layer in a case of obtaining the image data for display by using image data regarding higher frequency layers than the lowermost frequency layer. In this case, for example, information regarding blending processing may be added to at least the image data regarding the lowermost frequency layer, and the processing section may perform the de-blending processing on the image data regarding the lowermost frequency layer on the basis of the information regarding the blending processing. In this case, the information regarding the blending processing may include, for example, information regarding images to be blended and information regarding blending proportions.

In this way, according to the present technology, the image data regarding the plurality of frequency layers (only image data regarding the lowermost frequency layer is subjected to the blending processing using the image data regarding another frequency layer) obtained by hierarchically decomposing the image data at the predetermined frame frequency is received, and the image data for display is obtained according to the display capability, using the image data regarding the layers from the lowermost frequency layer up to the predetermined higher frequency layer.

It is, therefore, possible to reduce motion picture quality degradation caused by strobing in a layer of a basic frame frequency (frame frequency of the lowermost frequency layer) and to maintain a high image quality in layers of the other frame frequencies.

In addition, another concept of the present technology lies in a transmitting apparatus including a processing section that hierarchically decomposes image data at a predetermined frame frequency, that performs blending processing only on image data regarding a lowermost frequency layer to be blended with image data regarding another frequency layer, and that obtains image data regarding a plurality of frequency layers, and a transmitting section that transmits the image data regarding the plurality of frequency layers.

According to the present technology, the processing section hierarchically decomposes the image data at the predetermined frame frequency, performs the blending processing only on the image data regarding the lowermost frequency layer to be blended with the image data regarding another frequency layer, and obtains the image data regarding the plurality of frequency layers. The transmitting section then transmits this image data regarding the plurality of frequency layers.

For example, the image data at the predetermined frame frequency may include image data having a shutter angle of 360°. Also, for example, the predetermined frame frequency may be four or more times higher than the frame frequency of the lowermost frequency layer, and in the processing section, the image data regarding the plurality of frequency layers may be obtained by hierarchically decomposing the image data at the predetermined frame frequency into three or more layers. In this case, for example, the predetermined frame frequency may include 240 Hz, the frame frequency of the lowermost frequency layer may include 60 Hz, and the image data regarding the plurality of frequency layers may contain image data in a 60-Hz layer, image data in a 120-Hz layer, and image data in a 240-Hz layer obtained by hierarchically decomposing the image data at the frame frequency of 240 Hz into three layers.

For example, the transmitting apparatus may further include an information addition section that adds information regarding blending processing to at least the image data regarding the lowermost frequency layer. In this case, the information regarding the blending processing may include, for example, information regarding images to be blended and information regarding blending proportions.

In this way, according to the present technology, the image data in the plurality of frequency layers (only the image data regarding the lowermost frequency layer is subjected to the blending processing using the image data regarding another frequency layer) obtained by hierarchically decomposing the image data at the predetermined frame frequency is transmitted. It is, therefore, possible for a receiving side to reduce motion picture quality degradation caused by strobing in a layer of a basic frame frequency (frame frequency of the lowermost frequency layer) and to maintain a high image quality in layers of the other frame frequencies.

BRIEF DESCRIPTION OF DRAWINGS

FIG. 4 is a block diagram depicting an example of a configuration of a preprocessor in the transmitting apparatus.

FIG. 5 depicts explanatory diagrams of processing by the preprocessor.

FIG. 6 is a diagram depicting an example of a structure of a blending-information/SEI message.

FIG. 7 is a diagram depicting contents of principal information in the example of the structure of the blending-information/SEI message.

FIG. 8 is a diagram depicting a specific example of each piece of information in a case of adding blending processing information only to pictures in a 60-Hz layer.

FIG. 9 is a diagram depicting a specific example of each piece of information in the case of adding the blending processing information only to pictures in the 60-Hz layer.

FIG. 10 is a diagram depicting a specific example of each piece of information in a case of adding the blending processing information to all pictures.

FIG. 23 is a diagram depicting an example of a structure of HDMI/Blending-information/InfoFrame.

DESCRIPTION OF EMBODIMENT

A mode for carrying out the present disclosure (hereinafter, referred to as an "embodiment") will be described hereinafter. It is noted that the present disclosure will be described in the following order.

1. Embodiment
2. Modifications

1. Embodiment

<<Transmitting and Receiving System>>

Figure 1:
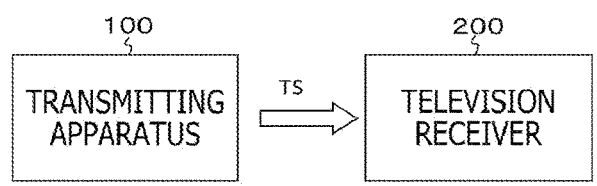
FIG. 1 is a block diagram depicting an example of a configuration of a transmitting and receiving system as an embodiment.

FIG. 1 depicts an example of a configuration of a transmitting and receiving system 10 as an embodiment. This transmitting and receiving system 10 includes a transmitting apparatus 100 and a television receiver 200.

The transmitting apparatus 100 transmits a transport stream TS serving as a container while carrying the transport stream TS on a broadcast wave. This transport stream TS contains a basic stream, a first extended stream, and a second extended stream obtained by processing image data at a predetermined frame frequency, which is a frame frequency of 240 Hz that is a high frame rate in this embodiment. The image data at the frame frequency of 240 Hz has a shutter angle of 360°. Further, it is assumed that each stream has an NAL (Network Abstraction Layer) unit structure.

Each stream contains coded image data regarding image data in a 60-Hz layer, image data in a 120-Hz layer, and image data in a 240-Hz layer obtained by hierarchically decomposing the image data at the frame frequency of 240 Hz into three layers. It is noted herein that images in the 60-Hz layer are frame frequency images in a lowermost frequency layer that configures a basic frame frequency. Only the image data in the 60-Hz layer is subjected to blending processing by use of the image data in the 120-Hz layer and the image data in the 240-Hz layer. Information regarding the blending processing (such as information regarding images to be blended and information regarding blending proportions) is added to at least the image data in the 60-Hz layer. A receiving side is thereby capable of easily and appropriately performing de-blending processing (blending cancellation processing) on the image data in the 60-Hz layer, on the basis of this information regarding the blending processing.

Figure 2:
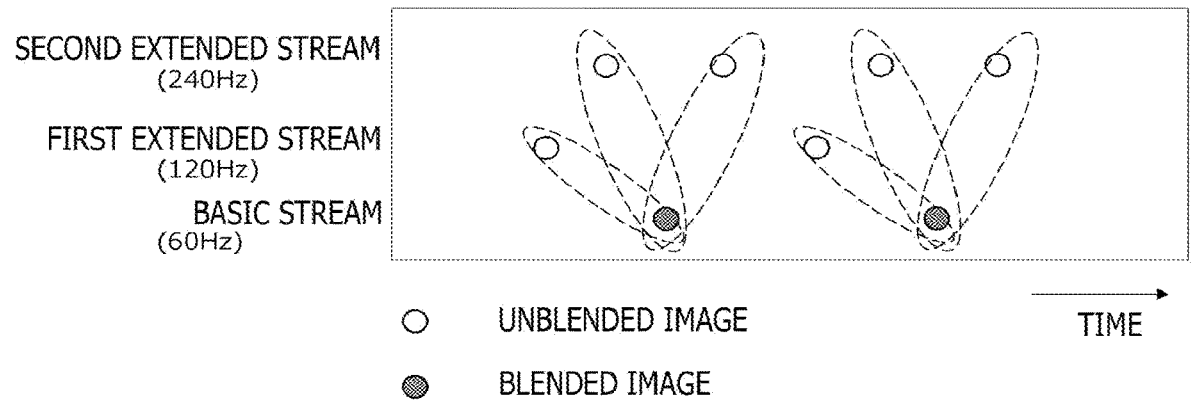
FIG. 2 is a diagram depicting an outline of image data regarding frequency layers obtained by hierarchical decomposition.

FIG. 2 depicts an outline of the image data in the frequency layers obtained by hierarchical decomposition. The basic stream in the 60-Hz layer configures images at 60 Hz. In addition, the first extended stream in the 120-Hz layer and the basic stream in the 60-Hz layer configure images at 120 Hz. Moreover, the second extended stream in the 240-Hz layer, the first extended stream in the 120-Hz layer, and the basic stream in the 60-Hz layer configure images at 240 Hz. The blending processing is performed only on the image data in the 60-Hz layer, using the image data in the 120-Hz layer and the image data in the 240-Hz layer.

With reference back to FIG. 1, the television receiver 200 receives the transport stream TS described above transmitted from the transmitting apparatus 100 with the transport stream TS carried on the broadcast wave. In a case of having a decoding capability of processing image data at 60 Hz, the television receiver 200 processes only the basic stream contained in the transport stream TS, obtains the image data regarding frames in the image data at the frame frequency of 60 Hz, and reproduces images.

Further, in a case of having a decoding capability of processing image data at the frame frequency of 120 Hz or 240 Hz, the television receiver 200 processes both the basic stream and one of the extended streams contained in the transport stream TS, obtains image data regarding frames in the image data at the 120-Hz or 240-Hz frame frequency, and reproduces images. In this case, the television receiver 200 performs de-blending processing on the image data in the 60-Hz layer as appropriate.

Figure 3:
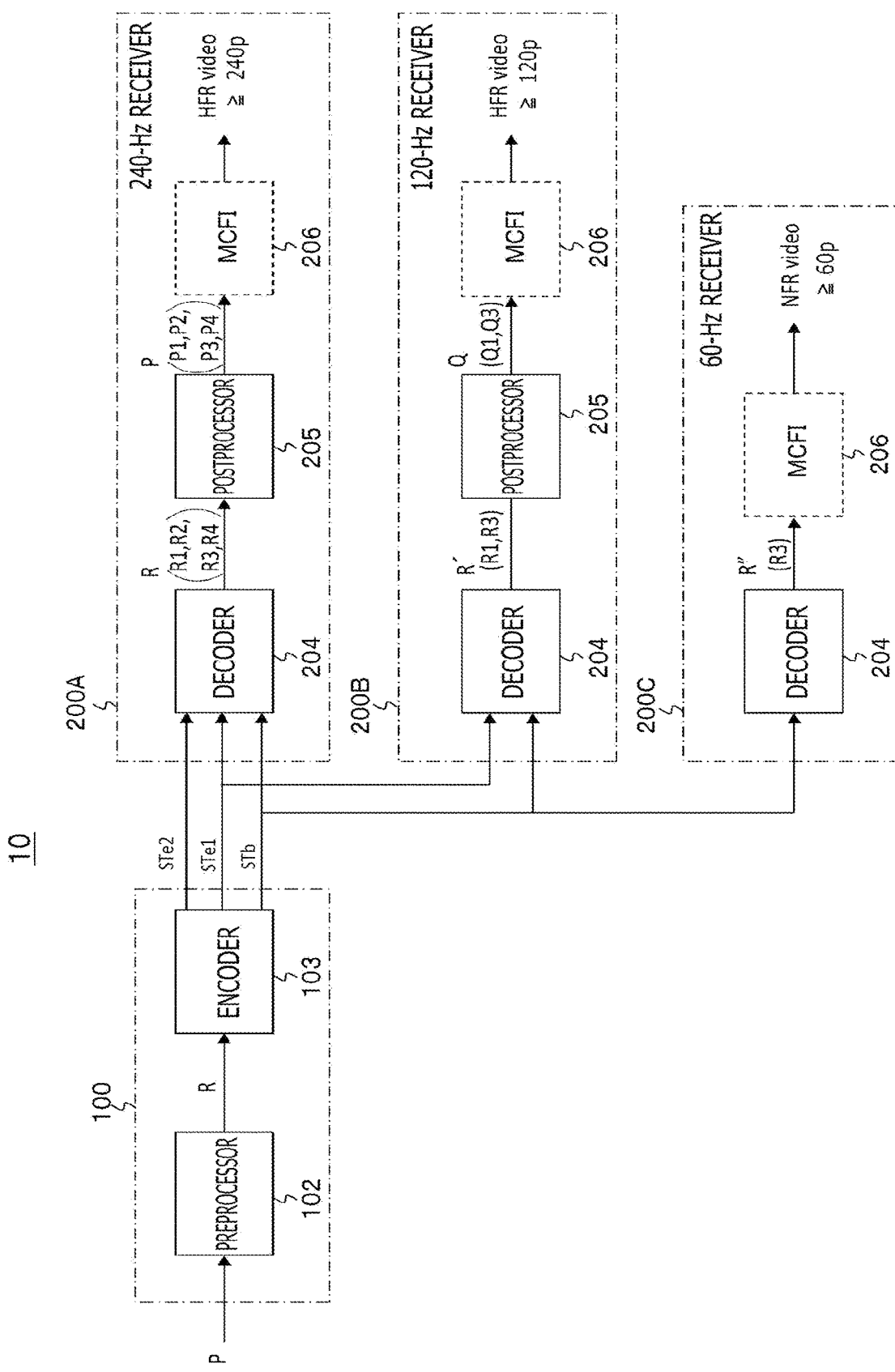
FIG. 3 is a diagram depicting an outline of configurations of a transmitting apparatus and a television receiver.

FIG. 3 depicts an outline of configurations of the transmitting apparatus 100 and the television receiver 200. Note that, while an image sequence that is an output R from a preprocessor 102 in the transmitting apparatus 100 and an image sequence that is an output R from a decoder 204 in a television receiver 200A are identical in time series, a case where the two image sequences differ in image quality since being passed through a codec is also included.

In the transmitting apparatus 100, the preprocessor 102 hierarchically decomposes image data P at the frame frequency of 240 Hz into three layers, and obtains image data R at the frame frequency of 240 Hz, the image data R containing the image data in the 60-Hz layer, the image data in the 120-Hz layer, and the image data in the 240-Hz layer. In this case, the preprocessor 102 performs the blending processing on the image data in the 60-Hz layer, using the image data in the 120-Hz layer and the image data in the 240-Hz layer.

FIG. 4 depicts an example of a configuration of the preprocessor 102 in the transmitting apparatus 100. This preprocessor 102 has a 240-Hz layer blending computing section 102a and a 120-Hz layer blending computing section 102b. The 240-Hz layer blending computing section 102a receives an input of the image data P at the frame frequency of 240 Hz described above and outputs image data Q at the frequency layer of 240 Hz.

FIG. 5(a) depicts the image data P at the frame frequency of 240 Hz. This image data P is configured in such a manner that four frame sections of P1, P2, P3, and P4 are repeated. FIG. 5(b) depicts the image data Q at the frame frequency of 240 Hz. This image data Q is configured such that four frame sections of Q1, Q2, Q3, and Q4 are repeated.

The 240-Hz layer blending computing section 102a performs processing for outputting, as image data regarding Q1, Q2, and Q4 frames in the image data Q, image data regarding P1, P2, and P4 frames in the image data P as they are, respectively. Also, the 240-Hz layer blending computing section 102a performs processing (blending processing) for outputting, as image data regarding each Q3 frame in the image data Q, blended image data t (P2, P3, P4) of image data regarding P2, P3, and P4 frames in the image data.

In this case, the image data regarding each Q3 frame is computed on the basis of the following Equation (1), using the image data regarding the P2, P3, and P4 frames. Here, P3 is the image data in the 60-Hz layer, and P2 and P4 are the image data in the 240-Hz layer. Also, c, d, and e denote blending proportions of the image data regarding the P2, P3, and P4 frames, respectively, and the blending proportions are, for example, c=¼, d=½, and e=¼.

$$Q3 = c*P2 + d*P3 + e*P4 \quad (1)$$

As 240-Hz layer blending parameters that are information used for performing the blending processing described above, "current_picture_position," "blend_coefficient_A," "blend_coefficient_B," and the like are applied to the 240-Hz layer blending computing section 102a. It is noted that details of these blending parameters will be described later.

Moreover, as for the 120-Hz layer blending computing section 102b, the image data Q at the frame frequency of 240 Hz output from the 240-Hz layer blending computing section 102a described above is input to the 120-Hz layer blending computing section 102b, and the image data R at the frame frequency of 240 Hz is output therefrom. FIG. 5(c) depicts the image data R at the frame frequency of 240 Hz. This image data R is configured in such a manner that four frame sections of R1, R2, R3, and R4 are repeated.

The 120-Hz layer blending computing section 102b performs processing for outputting, as image data regarding R1, R2, and R4 frames in the image data R, image data regarding Q1, Q2, and Q4 frames in the image data Q as they are, respectively. Also, the 120-Hz layer blending computing section 102b performs processing (blending processing) for outputting, as image data regarding each R3 frame in the image data R, blended image data t (Q1, Q3) of image data regarding Q1 and Q3 frames in the image data.

In this case, the image data regarding each R3 frame is computed on the basis of the following Equation (2), using the image data regarding the Q1 and Q3 frames. Here, Q3 is the image data in the 60-Hz layer, and Q1 is the image data in the 120-Hz layer. Further, a and b denote blending proportions of the image data regarding the Q1 and Q3 frames, respectively, and the blending proportions are, for example, a=⅕ and b=⅘.

$$R3 = a*Q1 + b*Q3 \quad (1)$$

As 120-Hz layer blending parameters that are information used for performing the blending processing described above, "current_picture_position," "blend_coefficient_A," "blend_coefficient_B," and the like are applied to the 120-Hz layer blending computing section 102b. It is noted that details of these blending parameters will be described later.

The image data regarding the R3 frames in the image data R configures the image data in the 60-Hz layer, the image data regarding R1 in the image data R configures the image data in the 60-Hz layer+60 Hz, that is, 120-Hz layer, and the image data regarding R2 and R4 in the image data R configures the image data in the 120-Hz layer+120 Hz, that is, 240-Hz layer. As depicted in FIG. 5(c), the image data regarding the R1, R2, and R4 frames in the image data R are identical to the image data regarding the P1, P2, and P4 frames in the image data P, respectively. Further, the image data regarding each R3 frame in the image data R is obtained by blending the image data regarding the P1 to P4 frames in the image data P.

In other words, the blending processing is not performed on the image data in the 120-Hz layer and the image data in the 240-Hz layer, and the blending processing is performed only on the image data in the 60-Hz layer, using the image data in the 120-Hz layer and the image data in the 240-Hz layer. A receiving side is thereby capable of reducing motion picture quality degradation caused by strobing in the layer of the basic frame frequency (60 Hz) and capable of maintaining a high image quality in the layers of the other frame frequencies (120 Hz and 240 Hz).

Further, in the transmitting apparatus 100, an encoder 103 performs hierarchical coding processing based on, for example, HEVC (High Efficiency Video Coding) on the image data R output from the preprocessor 102, and obtains a basic stream STb, a first extended stream STe1, and a second extended stream STe2.

The basic stream STb contains coded image data regarding the image data in the 60-Hz layer (refer to the image data regarding the R3 frames (pictures) of FIG. 5(c)). Also, the first extended stream contains coded image data regarding the image data in the 120-Hz layer (refer to the image data regarding the R1 frames (pictures) of FIG. 5(c)). Moreover, the second extended stream contains coded image data regarding the image data in the 240-Hz layer (refer to the image data regarding the R2 and R4 frames (pictures) of FIG. 5(c)).

Also, in the transmitting apparatus 100, the encoder 103 adds the information regarding the blending processing that includes the information regarding images to be blended, the information regarding the blending proportions, and the like to at least the image data in the 60-Hz layer. In this embodiment, a newly defined blending-information/SEI message (Blending_information SEI message) is inserted into an "SEIs" part in each access unit (AU).

FIG. 6 depicts an example of a structure (Syntax) of the blending-information/SEI message, and FIG. 7 depicts contents (Semantics) of principal information in the example of the structure. A "blending_information_id" field is identification information indicating the blending-information/SEI message. A "number_of_blending_layers" field indicates the number of frequency layers subjected to the blending processing. The following fields are repeated by as much as this number of frequency layers.

A "framerate_layer" field indicates an intended frequency layer. For example, "1" indicates 50 Hz, "2" indicates 60 Hz, "3" indicates 100 Hz, "4" indicates 120 Hz, "5" indicates 200 Hz, and "6" indicates 240 Hz. A "blend_flag" field indicates whether or not pictures concerned are being blended. For example, "1" indicates that pictures are being blended, and "0" indicates that pictures are not being blended. A "blend_target_flag" field indicates whether or not pictures concerned are subjected to the blending processing. For example, "1" indicates that the pictures are subjected to the blending processing, and "0" indicates that the pictures are not subjected to the blending processing.

A "shutter_angle" field indicates a shutter angle (a shutter aperture ratio with respect to a frame period) of an intended layer. For example, "1" indicates 360° (100%), "2" indicates 270° (75%, "3" indicates 180° (50%), and "4" indicates 90° (25%). A "temporal_filter_taps_minus_2" field indicates the number of pictures contributing to the blending processing. A value obtained by adding 2 to a value of this "temporal_filter_taps_minus2" field accounts for the number of pictures contributing to the blending processing.

A "current_picture_position" field indicates a temporal position of a current picture among the pictures contributing to the blending processing ("blend_target_flag" is "1"). In a case in which the number of pictures contributing to the blending processing is 2 ("temporal_filter_taps_minus2" is 0), "10" indicates that the current picture is higher in a temporal order out of the two pictures and "01" indicates lower in the temporal order out of the two pictures.

In addition, for 3 as the number of pictures contributing to the blending processing ("temporal_filter_taps_minus2" is 1), when pictures concerned are being blended ("blend_flag" is "1"), for example, "11" indicates that the current picture is median in the temporal order among three pictures. Moreover, for 3 as the number of pictures contributing to the blending processing ("temporal_filter_taps" is 3), when pictures concerned are not being blended ("blend_flag" is "0"), for example, "10" indicates that the current picture is highest in the temporal order among the three pictures, "11" indicates that the picture is median in the temporal order among the three pictures, and "01" indicates lowest in the temporal order among the three pictures.

Further, "blend_coefficient_A" and "blend_coefficient_B" fields are repeated by as much as the number of pictures contributing to the blending processing. The "blend_coefficient_A" field indicates a numerator of a coefficient of blending computing. The "blend_coefficient_B" field indicates a denominator of a coefficient of blending computing.

FIG. 8 depicts a specific example of each piece of information in a case of adding blending processing information only to pictures in the 60-Hz layer (refer to the R3 frames (pictures) of FIG. 5(c)). In this case, "number_of_blending_layers" is set to 2 and indicates that the number of frequency layers subjected to the blending processing is 2. In addition, in the first layer, "framerate_layer" is set to "6" and indicates that the intended frequency layer is 240 Hz.

In addition, in this 240-Hz frequency layer, the following respects are indicated. In other words, "blend_flag" is set to "1" and indicates that pictures concerned are being blended. Moreover, "blend_target_flag" is set to "1" and indicates that pictures concerned are subjected to the blending processing. Further, "shutter_angle" is set to "2" and indicates that the shutter angle is 270°. Here, the R3 has a motion component in a period of 120 Hz corresponding to 75% of a 240-Hz time base at a time of reproducing at 120 Hz; thus, "shutter_angle" is 270° (=2).

Also, "temporal_filter_taps_minus2" is set to 1 and indicates that the number of pictures contributing to the blending processing is 3. Moreover, "current_picture_position" is set to "11" and indicates that the picture concerned is median in the temporal order among the three pictures. Further, first "blend_coefficient_A" and "blend_coefficient_B" are set to 1 and 4, respectively and indicate that the blending proportion of the picture highest in the temporal order is ¼. Still further, second "blend_coefficient_A" and "blend_coefficient_B" are set to 1 and 4, respectively and indicate that the blending proportion of the picture median in the temporal order (picture concerned) is ½. Furthermore, third "blend_coefficient_A" and "blend_coefficient_B" are set to 1 and 4, respectively and indicate that the blending proportion of the picture lowest in the temporal order is ¼.

Moreover, in the second layer, "framerate_layer" is set to "4" and indicates that the intended frequency layer is 120 Hz.

Then, in this 120-Hz frequency layer, the following respects are indicated. In other words, "blend_flag" is set to "1" and indicates that pictures concerned are being blended. Also, "blend_target_flag" is set to "1" and indicates that pictures concerned are subjected to the blending processing. Moreover, "shutter_angle" is set to "1" and indicates that the shutter angle is 360°. Here, the R3 has a motion component in a period of 60 Hz corresponding to 100% of the 240-Hz time base at a time of reproducing at 60 Hz; thus, "shutter_angle" is 360° (=1). In this way, the R3 transmitted in a base layer as the lowermost frequency has two stages of shutter angles.

Also, "temporal_filter_taps_minus2" is set to 0 and indicates that the number of pictures contributing to the blending processing is 2. Moreover, "current_picture_position" is set to "01" and indicates that the picture concerned is lower in the temporal order out of the two pictures. Further, first "blend_coefficient_A" and "blend_coefficient_B" are set to 1 and 5, respectively and indicate that the blending proportion of the picture higher in the temporal order is ⅕. Still further, second "blend_coefficient_A" and "blend_coefficient_B" are set to 4 and 5, respectively and indicate that the blending proportion of the picture lower in the temporal order is ⅘.

FIG. 9 depicts a specific example of each piece of information in a case in which R2 frames in the image data R are subjected to the blending processing differently from the example of FIG. 5(c) and in which the blending processing information is added only to the pictures in the 60-Hz layer. In this case, "number_of_blending_layers" is set to 2 and indicates that the number of frequency layers subjected to the blending processing is 2. In addition, in the first layer, "framerate_layer" is set to "6" and indicates that the intended frequency layer is 240 Hz. While detailed description of each piece of information regarding this frequency layer of 240 Hz is omitted, the description is similar to that in the example of FIG. 8 described above.

Also, in the second layer, "framerate_layer" is set to "4" and indicates that the intended frequency layer is 120 Hz. In addition, in this frequency layer of 120 Hz, "current_picture_position" is set to "10" and indicates that the picture concerned is higher in the temporal order out of the two pictures. Moreover, first "blend_coefficient_A" and "blend_coefficient_B" are set to 4 and 5, respectively and indicate that the blending proportion of the picture higher in the temporal order is ⅘. Further, second "blend_coefficient_A" and "blend_coefficient_B" are set to 1 and 5, respectively and indicate that the blending proportion of the picture lower in the temporal order is ⅕. While detailed description is omitted, the other information is similar to that in the example of FIG. 8 described above.

FIG. 10 depicts a specific example of each piece of information in a case of adding the blending processing information to all pictures. This example depicts the case in which the R3 frames in the image data R are subjected to the blending processing similarly to FIG. 8. Since the blending processing information added to the pictures in the 60-Hz layer (refer to the R3 frames (pictures) of FIG. 5(c)) is similar to that in the example of FIG. 8, description thereof is omitted.

Blending processing information added to the pictures in the 120-Hz layer (refer to the R1 frames (pictures) of FIG. 5(c)) will be described. In this case, "number_of_blending_layers" is set to 1 and indicates that the number of frequency layers subjected to the blending processing is 1.

In the one layer, "framerate_layer" is set to "4" and indicates that the intended frequency layer is 120 Hz. Then, in this 120-Hz frequency layer, the following respects are indicated. In other words, "blend_flag" is set to "0" and indicates that pictures concerned are not being blended. In addition, "blend_target_flag" is set to "1" and indicates that pictures concerned are subjected to the blending processing. Moreover, "shutter_angle" is set to "3" and indicates that the shutter angle is 180°. Here, the R1 is used for reproducing at 120 Hz and has a motion component in a period of 120 Hz corresponding to 50° of the 240-Hz time base; thus, "shutter_angle" is 180° (=3).

Also, "temporal_filter_taps_minus2" is set to 0 and indicates that the number of pictures contributing to the blending processing is 2. Moreover, "current_picture_position" is set to "10" and indicates that the picture concerned is higher in the temporal order out of the two pictures. Further, first "blend_coefficient_A" and "blend_coefficient_B" are set to 1 and 5, respectively and indicate that the blending proportion of the picture (the picture concerned) higher in the temporal order is ⅕. Still further, second "blend_coefficient_A" and "blend_coefficient_B" are set to 4 and 5, respectively and indicate that the blending proportion of the picture lower in the temporal order is ⅘.

Next, blending processing information added to the pictures in the 240-Hz layer (refer to the R2 frames (pictures) of FIG. 5(c)) will be described. In this case, "number_of_blending_layers" is set to 1 and indicates that the number of frequency layers subjected to the blending processing is 1.

In the one layer, "framerate_layer" is set to "6" and indicates that the intended frequency layer is 240 Hz. Also, in this 240-Hz frequency layer, the following respects are indicated. In other words, "blend_flag" is set to "0" and indicates that pictures concerned are not being blended. Moreover, "blend_target_flag" is set to "1" and indicates that pictures concerned are subjected to the blending processing. Further, "shutter_angle" is set to "1" and indicates that the shutter angle is 360°. Here, the R2 is used for reproducing at 240 Hz and has a motion component in a period of 240 Hz along the 240-Hz time base; thus, "shutter_angle" is 360° (=1).

In addition, "temporal_filter_taps_minus2" is set to 1 and indicates that the number of pictures contributing to the blending processing is 3. Also, "current_picture_position" is set to "10" and indicates that the picture concerned is highest in the temporal order among the three pictures. Moreover, first "blend_coefficient_A" and "blend_coefficient_B" are set to 1 and 4, respectively and indicate that the blending proportion of the picture (the picture concerned) highest in the temporal order is ¼. Further, second "blend_coefficient_A" and "blend_coefficient_B" are set to 1 and 2, respectively and indicate that the blending proportion of the picture median in the temporal order is ½. Still further, third "blend_coefficient_A" and "blend_coefficient_B" are set to 1 and 4, respectively and indicate that the blending proportion of the picture lowest in the temporal order is ¼.

Next, blending processing information added to the pictures in the 240-Hz layer (refer to the R4 frames (pictures) of FIG. 5(c)) will be described. In this case, "number_of_blending_layers" is set to 1 and indicates that the number of frequency layers subjected to the blending processing is 1.

In the one layer, "framerate_layer" is set to "6" and indicates that the intended frequency layer is 240 Hz. Then, in this 240-Hz frequency layer, the following respects are indicated. In other words, "blend_flag" is set to "0" and indicates that pictures concerned are not being blended. Also, "blend_target_flag" is set to "1" and indicates that pictures concerned are subjected to the blending processing. Moreover, "shutter_angle" is set to "1" and indicates that the shutter angle is 360°. Here, the R4 is used for reproducing at 240 Hz and has a motion component in a period of 240 Hz along the 240-Hz time base; thus, "shutter_angle" is 360° (=1).

Also, "temporal_filter_taps_minus2" is set to 1 and indicates that the number of pictures contributing to the blending processing is 3. Moreover, "current_picture_position" is set to "01" and indicates that the picture concerned is lowest in the temporal order among the three pictures. Further, first "blend_coefficient_A" and "blend_coefficient_B" are set to 1 and 4, respectively and indicate that the blending proportion of the picture highest in the temporal order is ¼. Still further, second "blend_coefficient_A" and "blend_coefficient_B" are set to 1 and 2, respectively and indicate that the blending proportion of the picture median in the temporal order is ½. Furthermore, third "blend_coefficient_A" and "blend_coefficient_B" are set to 1 and 4, respectively and indicate that the blending proportion of the picture lowest in the temporal order is ¼.

In a television receiver 200A having a decoding capability of processing the image data at 240 Hz, the decoder 204 performs decoding processing on the three streams STb, STe1, and STe2, and outputs the image data R at the frame frequency of 240 Hz, the image data R containing image data R3 in the 60-Hz layer, image data R1 in the 120-Hz layer, and image data R2 and R4 in the 240-Hz layer.

Then, in the television receiver 200A, a postprocessor 205 processes the image data R at the frame frequency of 240 Hz, and obtains the image data P at the frame frequency of 240 Hz, the image data P containing image data P3 in the 60-Hz layer, image data P1 in the 120-Hz layer, and image data P2 and P4 in the 240-Hz layer. In this case, the postprocessor 205 performs de-blending processing (blending cancellation processing) on the image data in the 60-Hz layer, using the image data in the 120-Hz layer and the image data in the 240-Hz layer.

Figure 11:
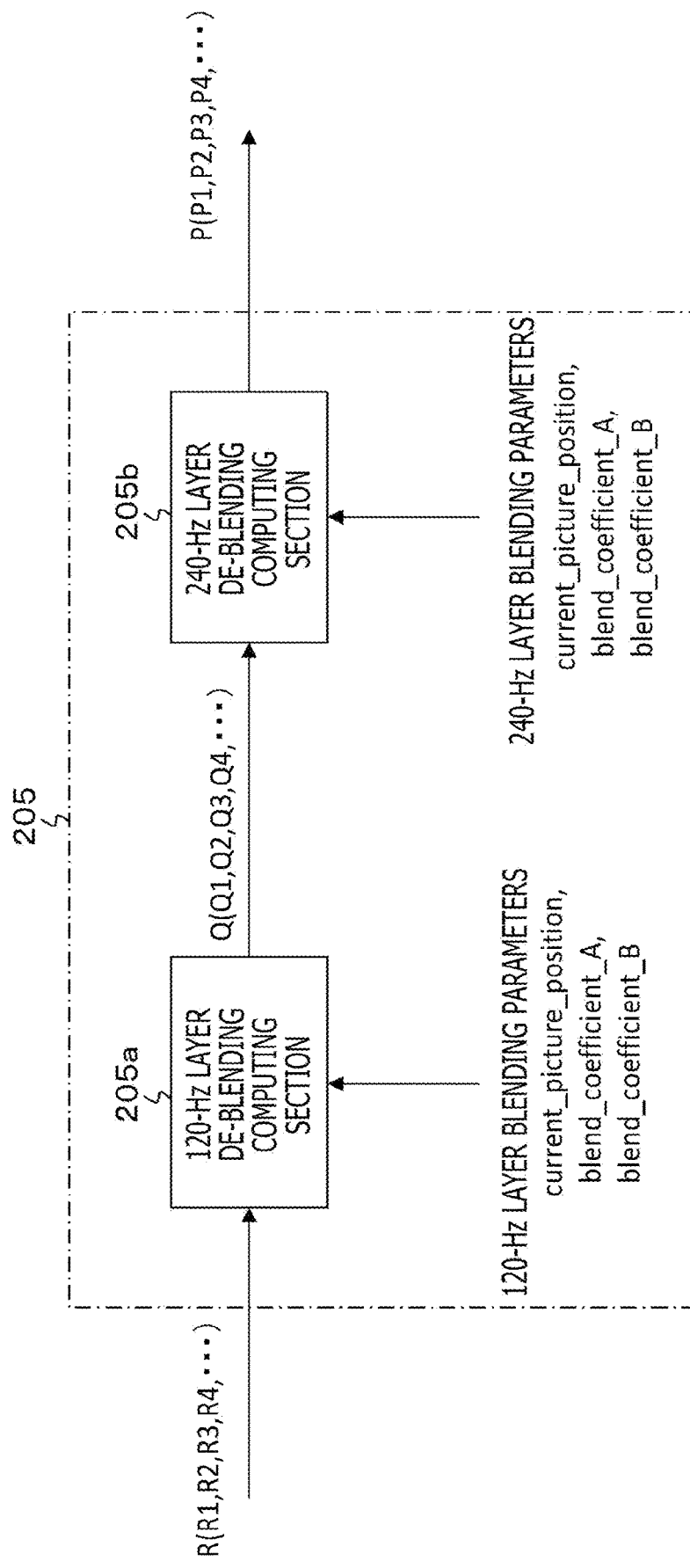
FIG. 11 is a block diagram depicting an example of a configuration of a postprocessor in a television receiver having a decoding capability of processing image data at 240 Hz.

FIG. 11 depicts an example of a configuration of the postprocessor 205 in the television receiver 200A. This postprocessor 205 has a 120-Hz layer de-blending computing section 205a and a 240-Hz layer de-blending computing section 205b. The 120-Hz layer de-blending computing section 205a receives an input of the image data R at the frame frequency of 240 Hz described above and outputs image data Q at the frame frequency of 240 Hz.

FIG. 12(a) depicts the image data R at the frame frequency of 240 Hz output from the decoder 204. This image data R is configured in such a manner that four frame sections of R1, R2, R3, and R4 are repeated. FIG. 12(b) depicts the image data Q at the frame frequency of 240 Hz output from the 120-Hz layer de-blending computing section 205a. This image data Q is configured in such a manner that four frame sections of Q1, Q2, Q3, and Q4 are repeated.

The 120-Hz layer blending computing section 205a performs processing for outputting, as image data regarding Q1, Q2, and Q4 frames in the image data Q, image data regarding R1, R2, and R4 frames in the image data R as they are, respectively. Moreover, the 120-Hz layer de-blending computing section 205a performs processing (de-blending processing) for outputting, as image data regarding each Q3 frame in the image data Q, image data t' (R1, R3) de-blended using image data regarding R1 and R3 frames. In this case, image data from which an image data component of an R1 frame is excluded is obtained as the image data regarding each Q3 frame. It is noted that this image data regarding each Q3 frame contains components of image data regarding R2 and R4 frames.

In this case, the image data regarding each Q3 frame is computed on the basis of the following Equation (3), using the image data regarding the R1 and R3 frames. Here, R3 is the image data in the 60-Hz layer and R1 is the image data in the 120-Hz layer. Moreover, a and b denote blending proportions of the image data regarding the Q1 and Q3 frames, respectively, in the 120-Hz layer blending computing section 102b of the preprocessor 102 described above, and the blending proportions are, for example, a=⅕ and b=⅘.

$$Q3=(1/b)\{(-1)*aR1+R3\} \quad (3)$$

As 120-Hz layer blending parameters that are information used for performing the de-blending processing described above, "current_picture_position," "blend_coefficient_A," "blend_coefficient_B," and the like are applied to the 120-Hz layer de-blending computing section 205a. The 120-Hz layer blending parameters added to the image data R by a transmitting side as described above are extracted and used by the decoder 204.

Moreover, the 240-Hz layer de-blending computing section 205b receives an input of the image data Q at the frame frequency of 240 Hz output from the 120-Hz layer de-blending computing section 205a described above and outputs the image data P at the frame frequency of 240 Hz. FIG. 12(c) depicts the image data P at the frame frequency of 240 Hz output from the 240-Hz layer de-blending computing section 205b. This image data P is configured in such a manner that four frame sections of P1, P2, P3, and P4 are repeated.

The 240-Hz layer de-blending computing section 205b performs processing for outputting, as image data regarding the P1, P2, and P4 frames in the image data P, image data regarding the Q1, Q2, and Q4 frames in the image data Q as they are, respectively. Also, the 240-Hz layer de-blending computing section 205b performs processing (de-blending processing) for outputting, as image data regarding each P3 frame in the image data P, image data t' (Q2, Q3, Q4) de-blended using the image data regarding the Q2, Q3, and Q4 frames in the image data. In this case, image data from which image data components of Q2 and Q4 frames are excluded is obtained as the image data regarding each P3 frame. The image data P output from the 240-Hz layer de-blending computing section 205b is thereby similar to the image data P at the frame frequency of 204 Hz input to the preprocessor 102 in the transmitting apparatus 100 described above.

In this case, the image data regarding each P3 frame is computed on the basis of the following Equation (4), using the image data regarding the Q2, Q3, and Q4 frames. Here, Q3 is the image data in the 60-Hz layer, and Q2 and Q4 are the image data in the 240-Hz layer. Also, c, d, and e denote blending proportions of the image data regarding the P2, P3, and P4 frames, respectively, in the 240-Hz layer blending computing section 102a in the preprocessor 102 described above, and the blending proportions are, for example, c=¼, d=½, and e=¼.

$$P3=(1/d)\{(-1)*c*Q2+Q3+(-1)*e*Q4\} \quad (4)$$

As 240-Hz layer blending parameters that are information used for performing the de-blending processing described above, "current_picture_position," "blend_coefficient_A," "blend_coefficient_B," and the like are applied to the 240-Hz layer de-blending computing section 205b. The 240-Hz layer blending parameters added to the image data R by the transmitting side as described above are extracted and used by the decoder 204.

With reference back to FIG. 3, in the television receiver 200A, the image data P at 240 Hz obtained by the postprocessor 205 is used as image data for display as it is or by frame interpolated by an MCFI (Motion Compensated Frame Insertion) section 206 to increase a frame rate. FIG. 12(d) depicts a display sequence in a case of using the image data P at 240 Hz as it is as the image data for display.

In addition, in a television receiver 200B having a decoding capability of processing image data at 120 Hz, the decoder 204 performs decoding processing on the two streams STb and STe1, and obtains image data R' at the frame frequency of 120 Hz, the image data R' containing image data R3 in the 60-Hz layer and image data R1 in the 120-Hz layer.

Then, in the television receiver 200B, the postprocessor 205 processes the image data R' at the frame frequency of 120 Hz, and obtains image data Q' at the frame frequency of 120 Hz, the image data Q' containing image data Q3 in the 60-Hz layer and image data Q1 in the 120-Hz layer. In this case, the postprocessor 205 performs de-blending processing (blending cancellation processing) on the image data in the 60-Hz layer, using the image data in the 120-Hz layer.

Figure 13:
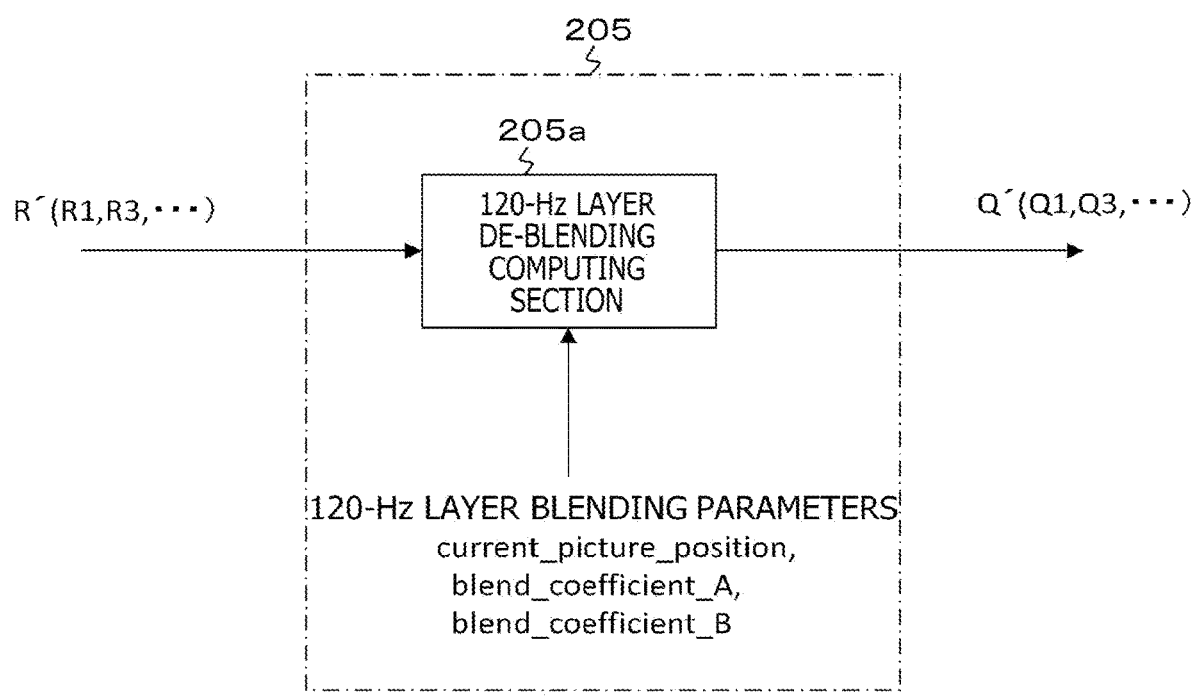
FIG. 13 is a block diagram depicting an example of a configuration of a postprocessor in a television receiver having a decoding capability of processing image data at 120 Hz.

FIG. 13 depicts an example of a configuration of the postprocessor 205 in the television receiver 200B. This postprocessor 205 has the 120-Hz layer de-blending computing section 205a. The 120-Hz layer de-blending computing section 205a receives an input of the image data R' at the frame frequency of 120 Hz described above and outputs the image data Q' at the frame frequency of 120 Hz.

Figure 14:
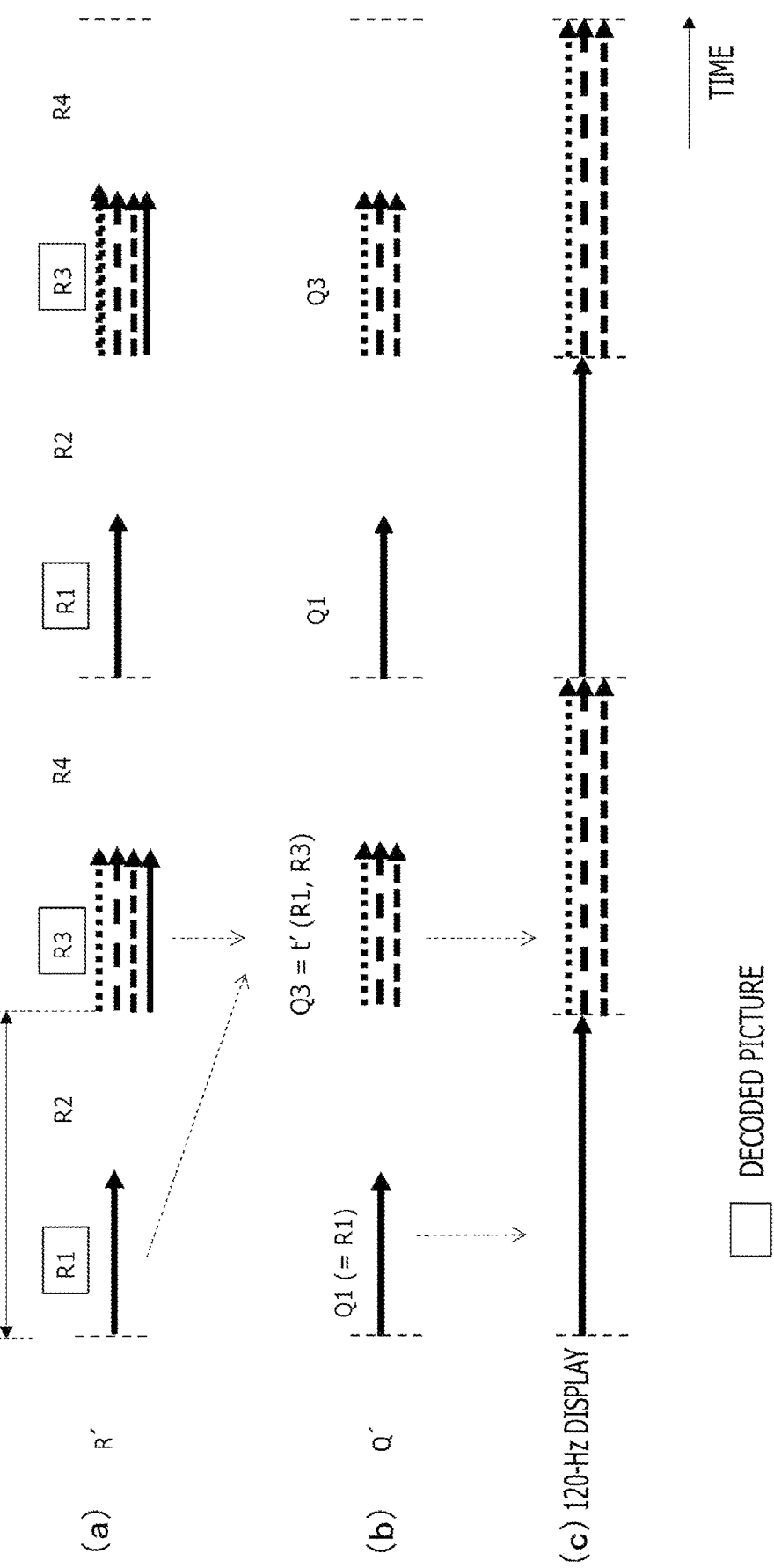
FIG. 14 depicts explanatory diagrams of processing by the postprocessor in the television receiver having the decoding capability of processing image data at 120 Hz.

FIG. 14(a) depicts the image data R' at the frame frequency of 120 Hz output from the decoder 204. This image data R' is configured in such a manner that two frame sections of R1 and R3 are repeated. FIG. 14(b) depicts the image data Q' at the frame frequency of 120 Hz output from the 120-Hz layer de-blending computing section 205a. This image data Q' is configured in such a manner that two frame sections of Q1 and Q3 are repeated.

The 120-Hz layer de-blending computing section 205a performs processing for outputting, as image data regarding each Q1 frame in the image data Q', image data regarding each R1 frame in the image data R' as it is. Also, the 120-Hz layer de-blending computing section 205a performs processing (de-blending processing) for outputting, as image data regarding each Q3 frame in the image data Q', image data t' (R1, R3) de-blended using image data regarding R1 and R3 frames in the image data. In this case, image data from which an image data component of an R1 frame is excluded is obtained as the image data regarding each Q3 frame. It is noted that this image data regarding each Q3 frame contains components of image data regarding R2 and R4 frames.

As 120-Hz layer blending parameters that are information used for performing the de-blending processing described above, "current_picture_position," "blend_coefficient_A," and "blend_coefficient_B," and the like are applied to the 120-Hz layer de-blending computing section 205a. The 120-Hz layer blending parameters added to the image data R' by the transmitting side as described above are extracted and used by the decoder 204.

With reference back to FIG. 3, in the television receiver 200B, the image data Q' at 120 Hz obtained by the postprocessor 205 is used as image data for display as it is or by frame interpolated by the MCFI (Motion Compensated Frame Insertion) section 206 to increase the frame rate. FIG. 14(c) depicts a display sequence in a case of using the image data Q' at 120 Hz as it is as the image data for display.

Also, in a television receiver 200C having a decoding capability of processing image data at 60 Hz, the decoder 204 performs decoding processing on the stream STb, and obtains image data R" at the frame frequency of 60 Hz, the image data R" containing R3 image data in the 60-Hz layer. This R3 image data in the 60-Hz layer is obtained by blending image data regarding the P1, P2, p3, and P4 frames in the image data P at the frame frequency of 240 Hz.

Figure 15:
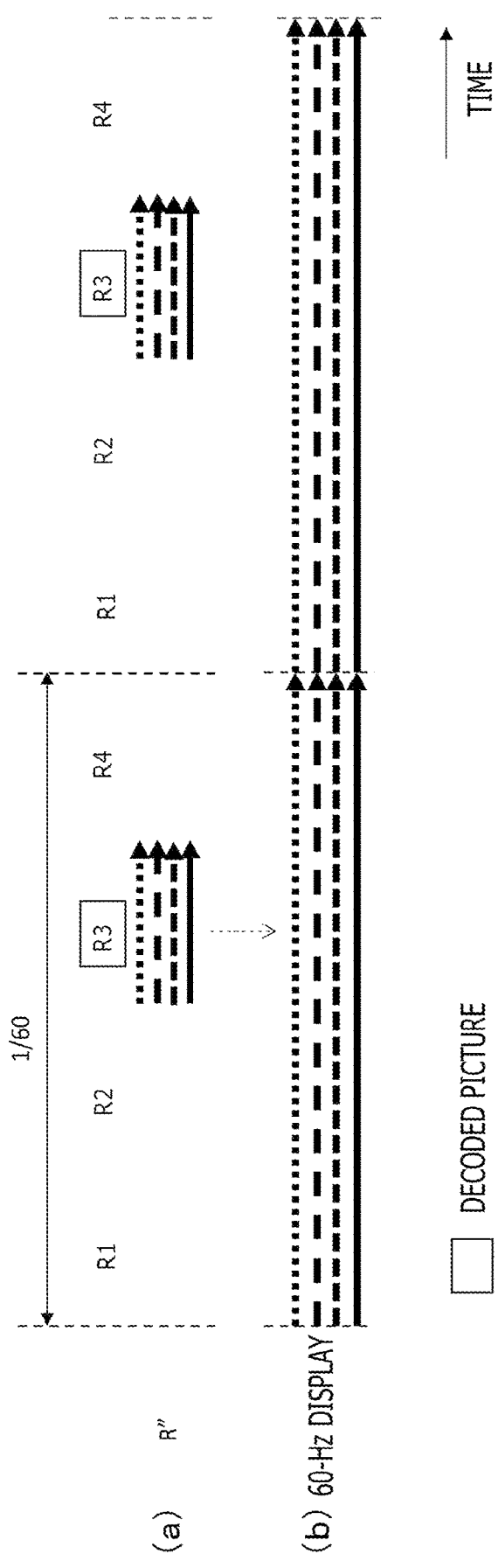
FIG. 15 depicts explanatory diagrams of processing by the television receiver having the decoding capability of processing image data at 120 Hz.

Then, in the television receiver 200C, this image data R" is used as image data for display as it is or by frame interpolated by the MCFI section 206 to increase the frame rate. FIG. 15(a) depicts the image data R" at the frame frequency of 60 Hz output from the decoder 204. This image data R" is configured in such a manner that a frame section of R3 is repeated. FIG. 15(b) depicts a display sequence in a case of using the image data R" at 60 Hz as it is as the image data for display.

"Configuration of Transmitting Apparatus"

Figure 16:
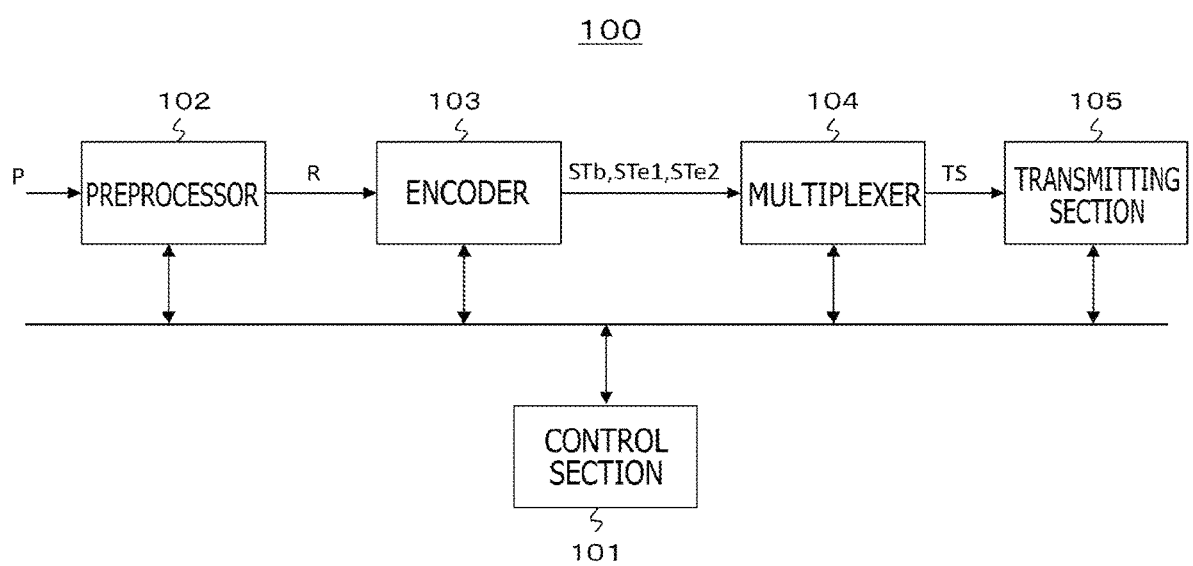
FIG. 16 is a block diagram depicting an example of a configuration of the transmitting apparatus.

FIG. 16 depicts an example of a configuration of the transmitting apparatus 100. This transmitting apparatus 100 has a control section 101, the preprocessor 102, the encoder 103, a multiplexer 104, and a transmitting section 105. The control section 101 controls operations of the sections in the transmitting apparatus 100.

The preprocessor 102 hierarchically decomposes the image data P at the frame frequency of 240 Hz into three layers, and outputs the image data R at the frame frequency of 240 Hz, the image data R containing the image data in the 60-Hz layer, the image data in the 120-Hz layer, and the image data in the 240-Hz layer (refer to FIGS. 4 and 5). In this case, only the image data in the 60-Hz layer is subjected to the blending processing using the image data in the 120-Hz layer and the image data in the 240-Hz layer.

The encoder 103 performs hierarchical coding processing based on, for example, the HEVC (High Efficiency Video Coding) on the image data R output from the preprocessor 102, and obtains the basic stream STb, the first extended stream STe1, and the second extended stream STe2. The basic stream STb contains herein the coded image data regarding the image data in the 60-Hz layer (refer to the image data regarding the R3 frames (pictures) of FIG. 5(c)).

Also, the first extended stream STe1 contains the coded image data regarding the image data in the 120-Hz layer (refer to the image data regarding the R1 frames (pictures) of FIG. 5(c)). Moreover, the second extended stream STe2 contains the coded image data regarding the image data in the 240-Hz layer (refer to the image data regarding the R2 and R4 frames (pictures) of FIG. 5(c)).

At this time, the encoder 103 adds the information regarding the blending processing including the information regarding the images to be blended, the information regarding the blending proportions, and the like to at least the image data in the 60-Hz layer.

Specifically, the newly defined blending-information/SEI message (refer to FIG. 6) is inserted into the "SEIs" part in the access unit (AU) per picture.

The multiplexer 104 packetizes the basic stream STb, the first extended stream STe1, and the second extended stream STe2 which are generated in the encoder 103 into PES (Packetized Elementary Stream) packets, further packetizes the basic stream STb, the first extended stream STe1, and the second extended stream STe2 into transport packets, and obtains the transport stream TS as a multiplexed stream. The transmitting section 105 modulates the transport stream TS by a modulating scheme, which is, for example, QPSK/OFDM, suited for broadcasting, and transmits an RF modulating signal from a transmitting antenna.

Figure 17:
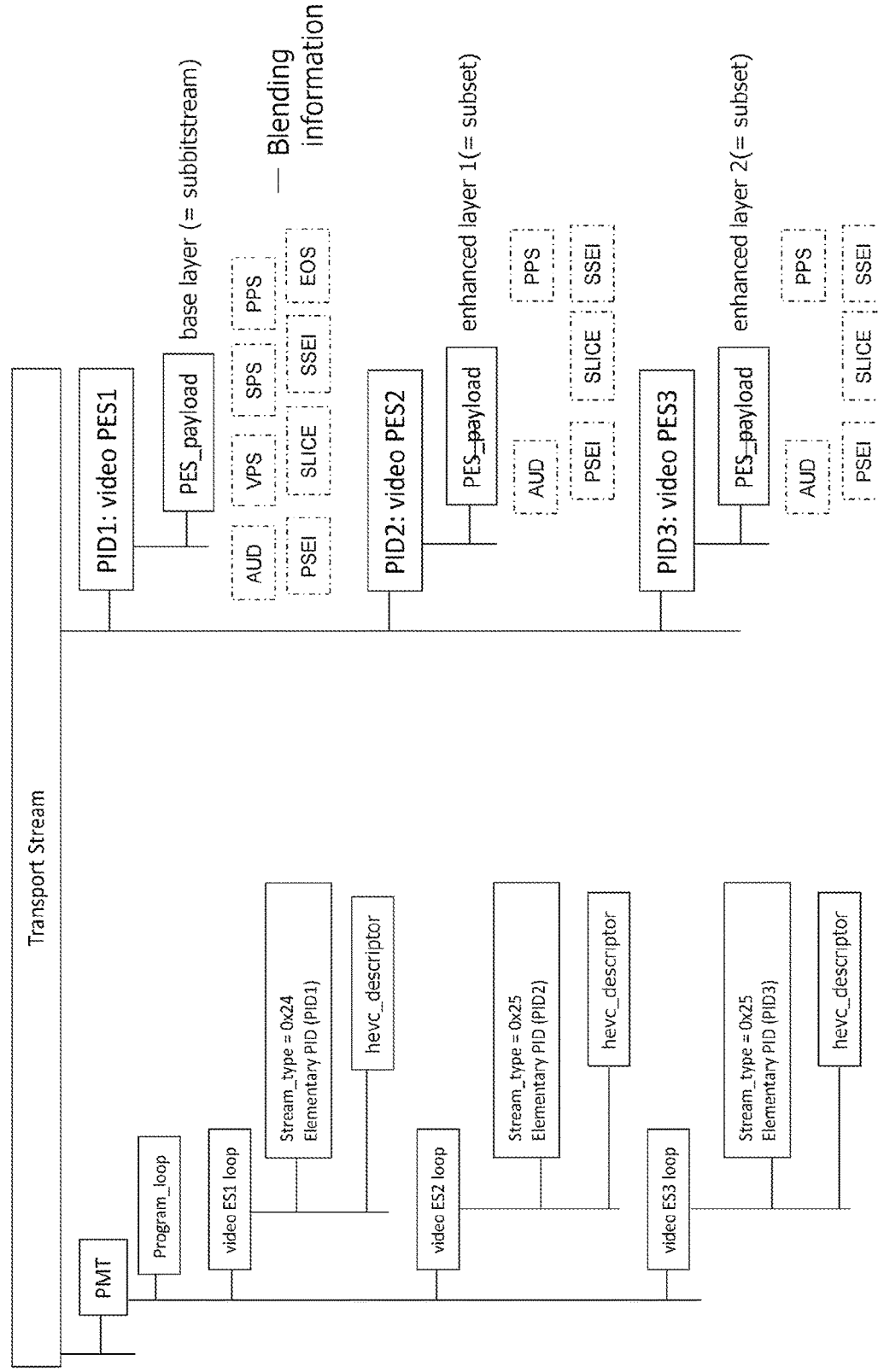
FIG. 17 is a diagram depicting an example of a configuration of a transport stream TS in a case of adding the blending processing information only to pictures in the 60-Hz layer.

FIG. 17 depicts an example of a configuration of the transport stream TS. This example is an example of a configuration in the case of adding the blending processing information only to the pictures in the 60-Hz layer. This transport stream TS contains three streams (sub-streams), that is, the basic stream (base stream) STb, the first extended stream (first enhancement stream) STe1, and the second extended stream (second enhancement stream) STe2.

In other words, in this configuration example, a PES packet "video PES1" of the basic stream STb identified by a packet identifier "PID1" is present, a PES packet "video PES2" of the first extended stream STe1 identified by a packet identifier "PID2" is present, and yet a PES packet "video PES3" of the second extended stream STe2 identified by a packet identifier "PID3" is present.

The blending-information/SEI message (refer to FIGS. 6, 8, and 9) is inserted into coded image data regarding each picture in the 60-Hz layer contained in the PES packet "video PES1."

The transport stream TS also contains a PMT (Program Map Table) as one of PSI (Program Specific Information). This PSI is information describing to which program each elementary stream contained in the transport stream belongs.

In the PMT, a program loop (Program loop) describing information associated with an overall program is present. Moreover, in the PMT, video elementary stream loops having information associated with the video streams are present. In this configuration example, a video elementary stream loop "video ES1 loop" corresponding to the basic stream STh is present, a video elementary stream loop "video ES2 loop" corresponding to the first extended stream STe1 is present, and yet a video elementary stream loop "video ES3 loop" corresponding to the second extended stream STe2 is present.

In the "video ES1 loop," information such as a stream type and a packet identifier (PID) is disposed to correspond to the basic stream STb (video PEST), and a descriptor describing information associated with the video stream is also disposed. For HEVC coding, the stream type is "0×24" indicating the basic stream.

In addition, in the "video ES2 loop," information such as a stream type and a packet identifier (PID) is disposed to correspond to the first extended stream STe1 (video PES2), and a descriptor describing information associated with the video stream is also disposed. For the HEVC coding, the stream type is "0×25" indicating the extended stream.

Moreover, in the "video ES3 loop," information such as a stream type and a packet identifier (PID) is disposed to correspond to the second extended stream STe2 (video PES3), and a descriptor describing information associated with the video stream is also disposed. For the HEVC coding, the stream type is "0×25" indicating the extended stream.

Figure 18:
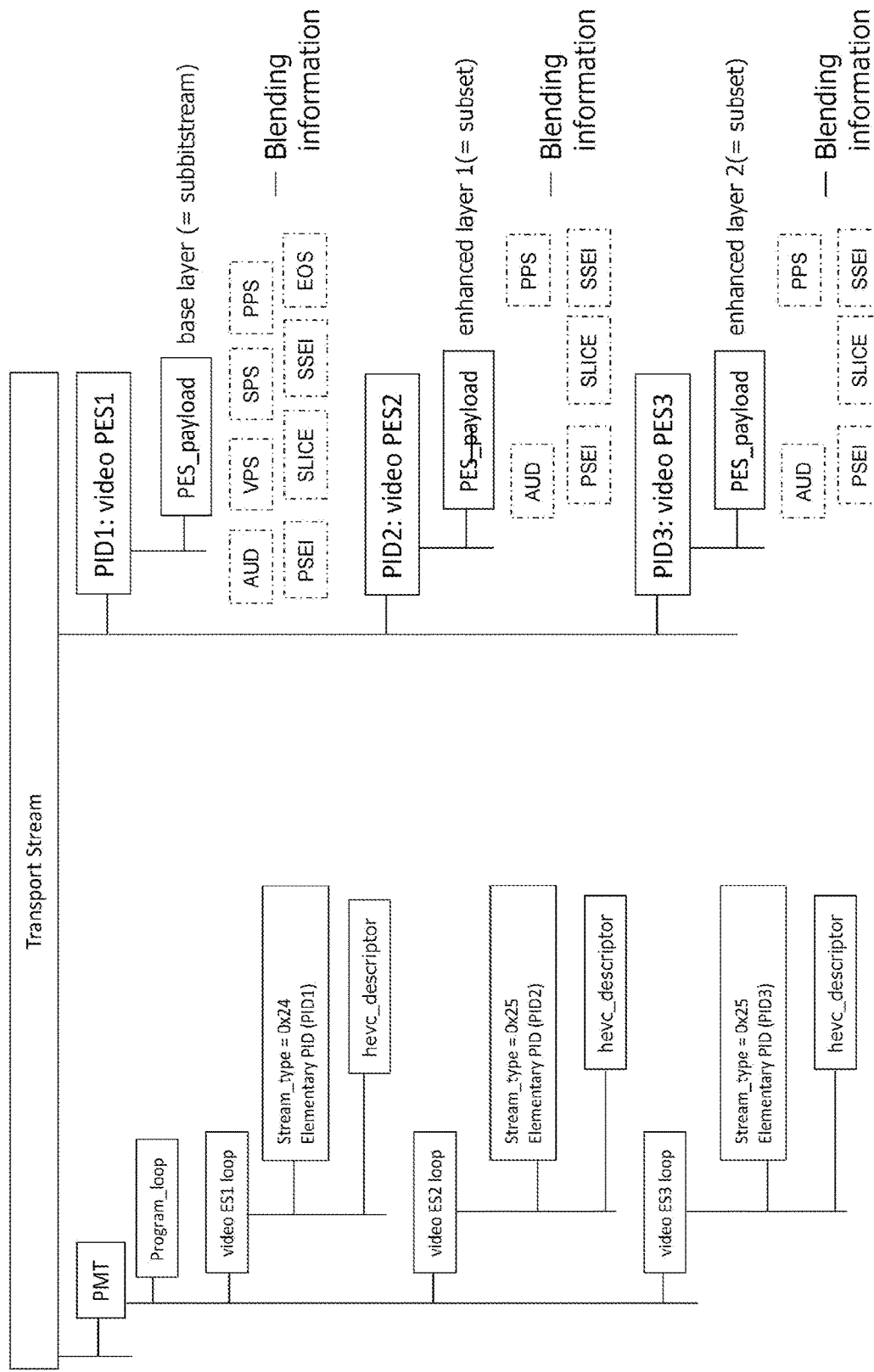
FIG. 18 is a diagram depicting an example of a configuration of the transport stream TS in a case of adding the blending processing information to all pictures.

FIG. 18 depicts another example of a configuration of the transport stream TS. This example is an example of a configuration in the case of adding the blending processing information to all pictures. The blending-information/SEI message (refer to FIGS. 6 and 10) is inserted into each of coded image data regarding each picture in the 60-Hz layer contained in the PES packet "video PES1," coded image data regarding each picture in the 120-Hz layer contained in the PES packet "video PES2," and coded image data regarding each picture in the 240-Hz layer contained in the PES packet "video PES3." Since the other parts are similar to those in the example of the configuration of the transport stream TS depicted in FIG. 17, detailed description thereof is omitted.

Operations of the transmitting apparatus 100 depicted in FIG. 16 will be briefly described. The image data P (refer to FIG. 5(a)) at the frame frequency of 240 Hz is input to the preprocessor 102 (refer to FIG. 4). This preprocessor 102 hierarchically decomposes the image data P into three layers, and obtains the image data R at the frame frequency of 240 Hz, the image data R containing the image data in the 60-Hz layer, the image data in the 120-Hz layer, and the image data in the 240-Hz layer (refer to FIG. 5(c)). Moreover, in this case, only the image data in the 60-Hz layer (refer to the image data regarding R3 frames (pictures) of FIG. 5(c)) is subjected to the blending processing using the image data in the 120-Hz layer and the image data in the 240-Hz layer.

The image data R at 240 Hz obtained by the preprocessor 102 is supplied to the encoder 103. The encoder 103 performs hierarchical coding processing based on, for example, the HEVC on the image data R, and obtains the basic stream STb, the first extended stream STe1, and the second extended stream STe2.

The basic stream STb contains coded image data regarding the image data in the 60-Hz layer (refer to the image data regarding the R3 frames (pictures) of FIG. 5(c)). The first extended stream STe1 contains the coded image data regarding the image data in the 120-Hz layer (refer to the image data regarding the R1 frames (pictures) of FIG. 5(c)). Moreover, the second extended stream STe2 contains the coded image data regarding the image data in the 240-Hz layer (refer to the image data regarding the R2 and R4 frames (pictures) of FIG. 5(c)).

In addition, the encoder 103 adds the information regarding the blending processing performed on at least the coded image data regarding pictures in the image data in the 60-Hz layer subjected to the blending processing. Specifically, the newly defined blending-information/SEI message (refer to FIG. 6) is inserted into the "SEIs" part in the access unit (AU) per picture in the image data in the 60-Hz layer.

The basic stream STb, the first extended stream STe1, and the second extended stream STe2 which are generated by the encoder 103 are supplied to the multiplexer 104. The multiplexer 104 packetizes the streams into PES packets, further packetizes the streams into transport packets, and obtains the transport stream TS as the multiplexed stream.

The transport stream TS generated by the multiplexer 104 is transmitted to the transmitting section 105. The transmitting section 105 modulates this transport stream TS by a modulating scheme, which is, for example, QPSK/OFDM, suited for broadcasting, and transmits this RF modulating signal from the transmitting antenna.

"Configuration of Television Receiver"

Figure 19:
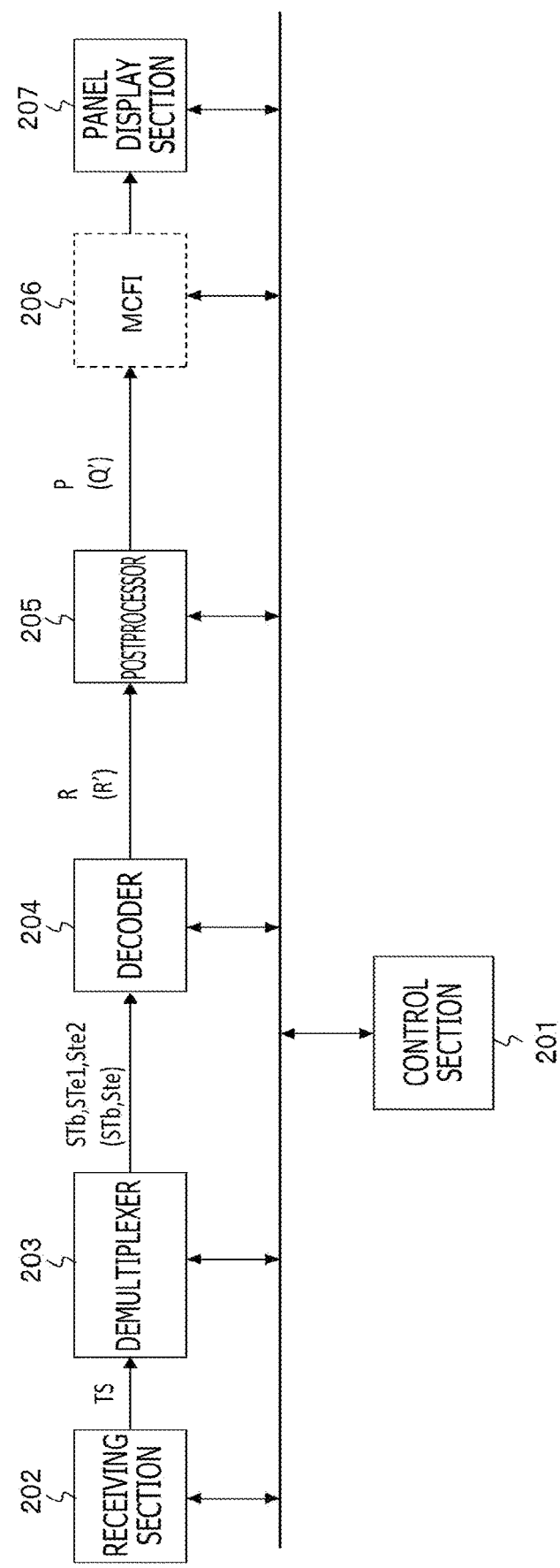
FIG. 19 is a block diagram depicting an example of a configuration of a television receiver having a decoding capability of processing image data at 240 Hz/120 Hz.

FIG. 19 is a block diagram depicting an example of a configuration of the television receiver 200A having the decoding capability of processing image data at 240 Hz. This television receiver 200A has the control section 201, a receiving section 202, a demultiplexer 203, the decoder 204, the postprocessor 205, the MCFI section 206, and a panel display section 207.

The control section 201 controls operations of the sections in the television receiver 200A. The receiving section 202 demodulates the RF modulating signal received in the receiving antenna and acquires the transport stream TS. The demultiplexer 203 extracts the basic stream STb, the first extended stream STe1, and the second extended stream STe2 from the transport stream TS by PID filtering, and supplies the basic stream STb, the first extended stream STe1, and the second extended stream STe2 to the decoder 204.

The decoder 204 performs decoding processing on the streams STb, STe1, and STe2, and obtains the image data R at the frame frequency of 240 Hz, the image data R containing the image data in the 60-Hz layer, the image data in the 120-Hz layer, and the image data in the 240-Hz layer (refer to FIG. 12(a)). In this case, only the image data in the 60-Hz layer is subjected to the blending processing using the image data in the 120-Hz layer and the image data in the 240-Hz layer.

Moreover, the decoder 204 extracts parameter sets and SEI inserted into the access units configuring the streams STb, STe1, and STe2, and sends the parameter sets and SEI to the control section 201. In this case, the decoder 204 also extracts blending-information/SEI message (refer to FIG. 6) having the information regarding the blending processing (including the information regarding the images to be blended, the information regarding the blending proportions, and the like). The control section 201 exercises control over the de-blending processing (blending cancellation processing) performed by the postprocessor 205 on the image data in the 60-Hz layer, on the basis of this information regarding the blending processing.

Figure 12:
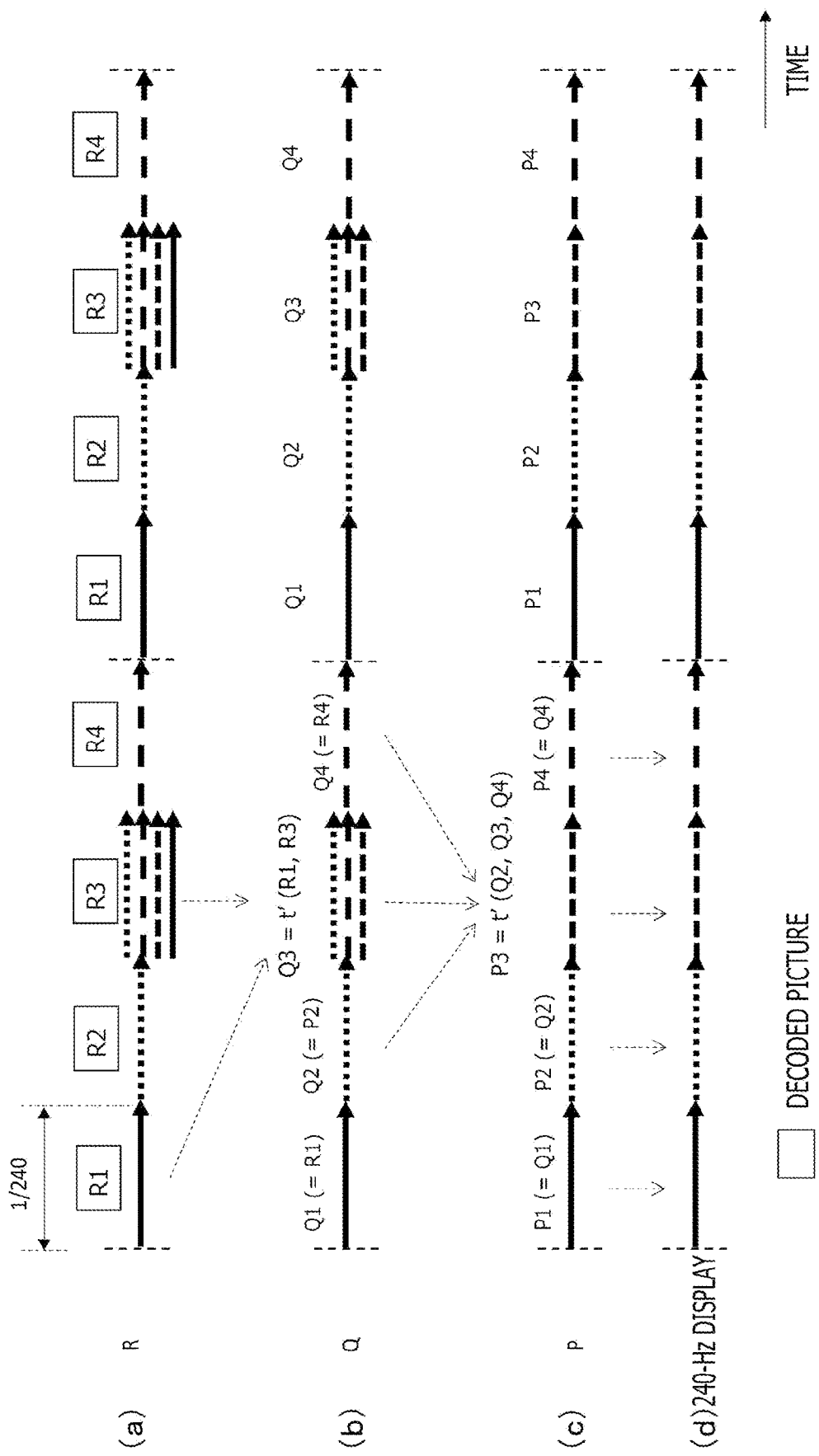
FIG. 12 depicts explanatory diagrams of processing by the postprocessor in the television receiver having the decoding capability of processing image data at 240 Hz.

The postprocessor 205 processes the image data R at the frame frequency of 240 Hz, and outputs the image data P at the frame frequency of 240 Hz, the image data P containing the image data in the 60-Hz layer, the image data in the 120-Hz layer, and the image data in the 240-Hz layer (refer to FIGS. 11 and 12). In this case, the postprocessor 205 performs the de-blending processing (blending cancellation processing) on the image data in the 60-Hz layer, using the image data in the 120-Hz layer and the image data in the 240-Hz layer, on the basis of the information regarding the blending processing.

The MCFI section 206 performs frame interpolation processing for motion compensation on the image data P at the frame frequency of 240 Hz obtained by the postprocessor 205, and obtains the image data the frame rate of which is further increased. It is noted that the television receiver 200A may not have this MCFI section 206, in some cases. The panel display section 207 displays images by the image data at 240 Hz obtained by the postprocessor 205 or the image data the frame rate of which is increased by the MCFI section 206.

Operations of the television receiver 200A depicted in FIG. 19 will be briefly described. The receiving section 202 demodulates the RF modulating signal received in the receiving antenna and acquires the transport stream TS. This transport stream TS is transmitted to the demultiplexer 203. The demultiplexer 203 extracts the basic stream STb, the first extended stream STe1, and the second extended stream STe2 from the transport stream TS by PID filtering, and supplies the basic stream STb, the first extended stream STe1, and the second extended stream STe2 to the decoder 204.

The decoder 204 performs the decoding processing on the streams STb, STe1, and STe2, and obtains the image data R at the frame frequency of 240 Hz (refer to FIG. 12(a)). This image data R contains the image data in the 60-Hz layer (refer to the image data regarding the R3 frames (pictures) of FIG. 12(a)), the image data in the 120-Hz layer (refer to the image data regarding the R1 frames (pictures) of FIG. 12(a)), and the image data in the 240-Hz layer (refer to the image data regarding the R2 and R4 frames (pictures) of FIG. 12(a)). Then, only the image data in the 60-Hz layer is subjected to the blending processing using the image data in the 120-Hz layer and the image data in the 240-Hz layer.

Moreover, the decoder 204 extracts parameter sets and SEI inserted into each of the access units configuring the streams STb, STe1, and STe2, and transmits the parameter sets and the SEI to the control section 201. In this case, the decoder 204 also extracts blending-information/SEI message (refer to FIG. 6) having the information regarding the blending processing (including the information regarding the images to be blended, the information regarding the blending proportions, and the like). The control section 201 exercises control over the de-blending processing (blending cancellation processing) performed by the postprocessor 205 on the image data in the 60-Hz layer, on the basis of this information regarding the blending processing.

The image data R at the frame frequency of 240 Hz obtained by the decoder 204 is supplied to the postprocessor 205. The postprocessor 205 processes the image data R and obtains the image data P at the frame frequency of 240 Hz (refer to FIG. 12(c)). This image data P contains the image data in the 60-Hz layer (refer to the image data regarding the P3 frames (pictures) of FIG. 12(c)), the image data in the 120-Hz layer (refer to the image data regarding the P1 frames (pictures) of FIG. 12(c)), and the image data in the 240-Hz layer (refer to the image data regarding the P2 and P4 frames (pictures) of FIG. 12(c)).

In this case, the postprocessor 205 performs the de-blending processing (blending cancellation processing) on the image data in the 60-Hz layer, using the image data in the 120-Hz layer and the image data in the 240-Hz layer, on the basis of the information regarding the blending processing. Owing to this, the image data P at the frame frequency of 240 Hz output from the postprocessor 205 is image data for which blending in both the 120-Hz layer and the 240-Hz layer is cancelled and is similar to the image data P at the frame frequency of 240 Hz input to the preprocessor 102 in the transmitting apparatus 100 described above.

Either the image data at the frame frequency of 240 Hz obtained by the postprocessor 205 or the image data the frame rate of which is further increased by the MCFI section 206 is supplied to the panel display section 207, and the panel display section 207 displays images by the image data.

The television receiver 200B having the decoding capability of processing the image data at 120 Hz is configured similarly to the television receiver 200A of FIG. 19. In the case of the television receiver 200B, the demultiplexer 203 extracts the basic stream STb and the first extended stream STe1 from the transport stream TS by PID filtering, and supplies the basic stream STb and the first extended stream STe1 to the decoder 204.

Also, in the case of the television receiver 200B, the decoder 204 performs the decoding processing on the streams STb and STe1, and obtains the image data R' at the frame frequency of 120 Hz (refer to FIG. 14(a)). This image data R' contains the image data in the 60-Hz layer (refer to the image data regarding the R3 frames (pictures) of FIG. 14(a)) and the image data in the 120-Hz layer (refer to the image data regarding the R1 frames (pictures) of FIG. 14(a)). Moreover, only the image data in the 60-Hz layer is subjected to the blending processing using the image data in the 120-Hz layer and the image data in the 240-Hz layer.

Moreover, in the case of the television receiver 200B, the postprocessor 205 processes the image data R' and obtains the image data Q' at the frame frequency of 120 Hz (refer to FIG. 14(b)). This image data Q' contains the image data in the 60-Hz layer (refer to the image data regarding the Q3 frames (pictures) of FIG. 14(b)) and the image data in the 120-Hz layer (refer to the image data regarding the Q1 frames (pictures) of FIG. 14(b)).

In this case, the postprocessor 205 performs the de-blending processing (blending cancellation processing) on the image data in the 60-Hz layer, using the image data in the 120-Hz layer, on the basis of the information regarding the blending processing. Owing to this, the image data Q' at the frame frequency of 120 Hz output from the postprocessor 205 is image data for which blending in the 120-Hz layer is cancelled.

Then, in the case of the television receiver 200B, either the image data at the frame frequency of 120 Hz obtained by the postprocessor 205 or the image data the frame rate of which is further increased by the MCFI section 206 is supplied to the panel display section 207, and this panel display section 207 displays images by the image data.

Figure 20:
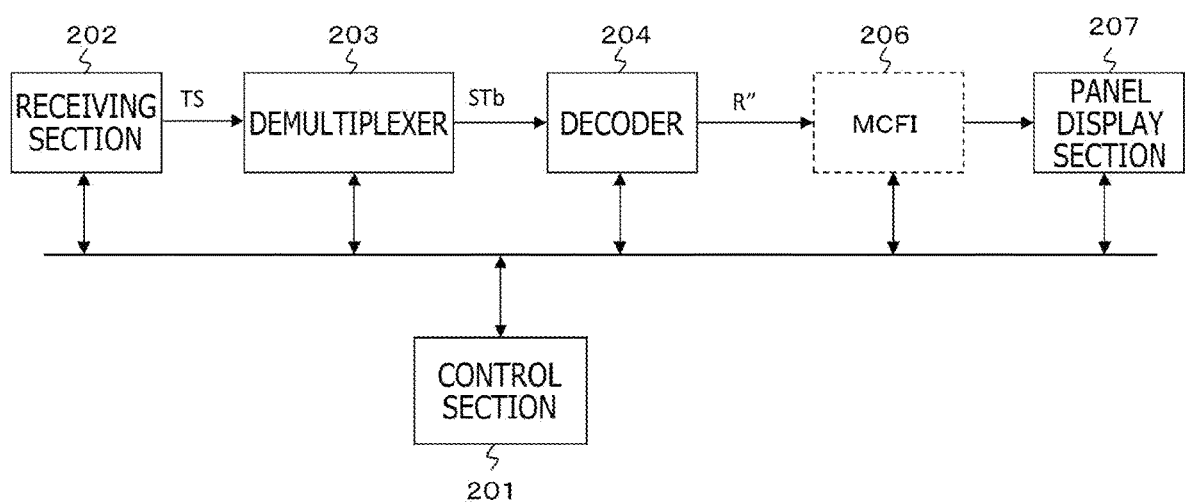
FIG. 20 is a block diagram depicting an example of a configuration of a television receiver having a decoding capability of processing image data at 60 Hz.

FIG. 20 depicts an example of a configuration of the television receiver 200C having the decoding capability of processing image data at 60 Hz. This television receiver 200C has the control section 201, the receiving section 202, the demultiplexer 203, the decoder 204, the MCFI section 206, and the panel display section 207.

The control section 201 controls operations of the sections in the television receiver 200C. The receiving section 202 demodulates the RF modulating signal received in the receiving antenna and acquires the transport stream TS. The demultiplexer 203 extracts the basic stream STb from the transport stream TS by PID filtering, and supplies the basic stream STb to the decoder 204.

The decoder 204 performs the decoding processing on the stream STb, and obtains the image data R" at the frame frequency of 60 Hz, the image data R" containing the image data in the 60-Hz layer (refer to FIG. 15(a)). This image data in the 60-Hz layer is subjected to the blending processing using the image data in the 120-Hz layer and the image data in the 240-Hz layer.

The MCFI section 206 performs frame interpolation processing for motion compensation on this image data at the frame frequency of 60 Hz, and obtains the image data the frame rate of which is further increased. It is noted that the television receiver 200C may not have this MCFI section 206, in some cases. The panel display section 207 displays images by either the image data at the frame frequency of 60 Hz obtained by the decoder 204 or the image data the frame rate of which is increased by the MCFI section 206.

Operations of the television receiver 200C depicted in FIG. 20 will be briefly described. The receiving section 202 demodulates the RF modulating signal received in the receiving antenna and acquires the transport stream TS. This transport stream TS is transmitted to the demultiplexer 203. The demultiplexer 203 extracts the basic stream STb from the transport stream TS by PID filtering, and supplies the basic stream STb to the decoder 204.

The decoder 204 performs the decoding processing on the basic stream STb, and obtains the image data R" at the frame frequency of 60 Hz (refer to FIG. 15(a)). This image data R" contains the image data in the 60-Hz layer (refer to the image data regarding the R3 frames (pictures) of FIG. 15(a)). This image data in the 60-Hz layer is subjected to the blending processing using the image data in the 120-Hz layer and the image data in the 240-Hz layer.

The image data at the frame frequency of 60 Hz obtained by the decoder 204 or the image data the frame rate of which is further increased by the MCFI section 206 is supplied to the panel display section 207, and this panel display section 207 displays images by the image data.

As described so far, in the transmitting and receiving system 10 depicted in FIG. 1, the image data in the three frequency layers of the 60-Hz layer, the 120-Hz layer, and the 240-Hz layer (only the image data in the 60-Hz layer is subjected to the blending processing using the image data in another frequency layer) obtained by hierarchically decomposing the image data at the frame frequency of 240 Hz into the three layers is transmitted on the transmitting side. Owing to this, on the receiving side, it is possible to reduce motion picture quality degradation caused by strobing in the layer of the basic frame frequency of 60 Hz and maintain a high image quality in the layers of the frame frequencies of 120 Hz and 240 Hz.

Also, in the transmitting and receiving system 10 depicted in FIG. 1, on the receiving side, the image data in the three frequency layers of the 60-Hz layer, the 120-Hz layer, and the 240-Hz layer (only the image data in the 60-Hz layer is subjected to the blending processing using the image data in another frequency layer) obtained by hierarchically decomposing the image data at the frame frequency of 240 Hz into the three layers is received, and the image data for display is obtained according to the display capability by use of the image data in the layers from the 60-Hz layer up to the predetermined higher frequency layer. Owing to this, on the receiving side, it is possible to reduce motion picture quality degradation caused by strobing in the layer of the basic frame frequency of 60 Hz and maintain a high image quality in the layers of the frame frequencies of 120 Hz and 240 Hz.

2. Modifications

While the example of transmitting and receiving the image data in the three frequency layers of the 60-Hz layer, the 120-Hz layer, and the 240-Hz layer obtained by hierarchically decomposing the image data at the frame frequency of 240 Hz into the three layers has been described in the embodiment described above, the frame frequency of the original image data subjected to hierarchical decomposition, the number of layers, and the frequency of each layer are not limited to those in this example.

Figure 21:
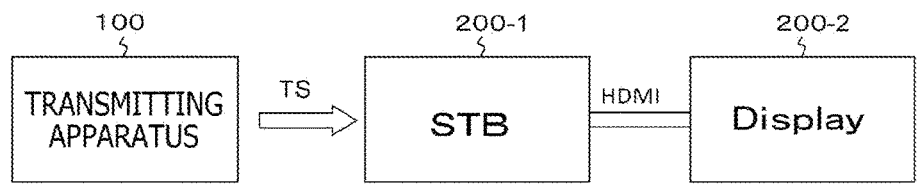
FIG. 21 is a block diagram depicting another example of a configuration of a transmitting and receiving system.

Also, while the example of the transmitting and receiving system 10 including the transmitting apparatus 100 and the television receiver 200 has been described in the embodiment described above, configurations of the transmitting and receiving system to which the present technology is applicable are not limited to those in the example. For example, as depicted in FIG. 21, a transmitting and receiving system 10A in which the television receiver 200 part is replaced by a set-top box 200-1 and a display 200-2 connected to each other by a digital interface which is, for example, an HDMI (High-Definition Multimedia Interface) is considered to be the transmitting and receiving system to which the present technology is applicable. It is noted that "HDMI" is a registered trademark.

Figure 22:
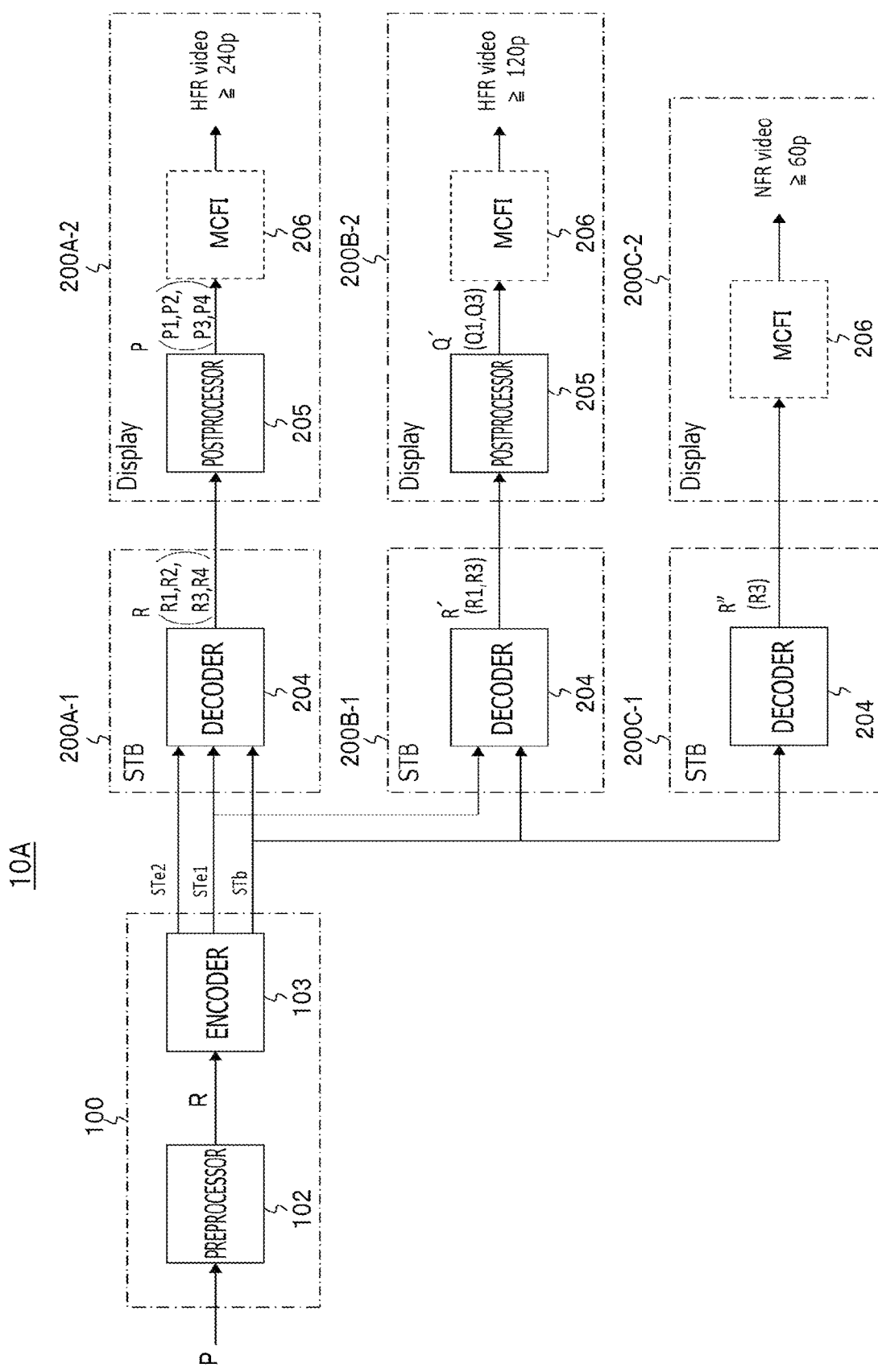
FIG. 22 is a diagram depicting an outline of configurations of a transmitting apparatus, a set-top box, and a display.

FIG. 22 depicts an outline of configurations of the transmitting apparatus 100, a set-top box 200A, and a display 200B in that case. While detailed description is omitted, the transmitting apparatus 100, the set-top box 200A-1, and the display 200A-2 operate similarly to the configurations of the transmitting apparatus 100 and the television receiver 200 depicted in FIG. 3. It is noted that the set-top box 200A-1 transmits the information regarding the blending processing for performing the de-blending processing (blending cancellation processing) on the image data in the 60-Hz layer together with the image data R at the frame frequency of 240 Hz to the display 200A-1. Likewise, a set-top box 200B-1 transmits the information regarding the blending processing for performing the de-blending processing (blending cancellation processing) on the image data in the 60-Hz layer together with the image data R' at the frame frequency of 120 Hz to a display 200B-1. It is noted that functions of the postprocessor 205 are also considered to be imparted to the decoder 204.

The set-top box 200A-1 or 200B-1 transmits the information regarding the blending processing to be added to each picture by, for example, inserting the information into a blanking period in the image data regarding each picture. A newly defined HDMI/Blending-information/InfoFrame (HDMI blending Information InfoFrame) is used herein.

FIG. 23 depicts an example of a structure (Syntax) of the HDMI/Blending-information/InfoFrame, this example of the structure (Syntax) corresponds to the example of the structure (Syntax) of the blending-information/SEI message of FIG. 6 described above, and description of details of individual information is omitted. First three bytes of this InfoFrame are a header part, and information including an InfoFrame type, a version number, and a byte length of data bytes is disposed in the header part.

Eight-bit information of "number_of_blending_layers" is disposed in a data byte 0 (N+0). Eight-bit information of "framerate_layer" is disposed in a data byte 1 (N+1). One-bit information of "blending_flag" is disposed in a data byte 2 (N+2). Also, one-bit information of "blend_target_flag" is disposed in a sixth bit of the data byte 2 (N+2). Moreover, four-bit information of "shutter_angle" is disposed in fifth to second bits of the data byte 2 (N+2). Further, two-bit information of "temporal_filter_taps_minus2" is disposed in first to zero-th bits of the data byte 2 (N+2).

Moreover, two-bit information of "current_picture_position" is disposed in seventh to sixth bits of a data byte 3 (N+3). Further, eight-bit information of "blend_coefficient_A" is disposed in a data byte 4 (N+4). Still further, eight-bit information of "blend_coefficient_B" is disposed in a data byte 5 (N+5). Then, similar spaces to the data bytes 4 and 5 are allocated to a data byte 6 (N+6) and subsequent data bytes by as much as a value obtained by adding 2 to "Temporal_filter_taps_minus2." Furthermore, the data byte 1 to the data byte 5 (or the spaces allocated to the data byte 6 and the subsequent data bytes described above) are repeated by as much as a value of "number_of_blending_layers."

Moreover, the example in which the container is the transport stream (MPEG-2 TS) has been described in the embodiment described above. However, the present technology is similarly applicable also to a system configured in such a manner that a container is delivered to a receiving terminal by use of a network such as the Internet. In Internet delivery, a container in MP4 or the other format is often used for delivery. In other words, the container corresponds to any of containers in various types of formats including the transport stream (MPEG-2 TS) adopted in digital broadcasting standards, MMT (MPEG Media Transport), and ISOBMFF (MP4) used in the Internet delivery.

Further, the present technology can also be configured as follows.

(1) A receiving apparatus including:
a receiving section that receives image data regarding a plurality of frequency layers obtained by hierarchically decomposing image data at a predetermined frame frequency, in which
only image data regarding a lowermost frequency layer among the image data regarding the plurality of frequency layers is subjected to blending processing using image data regarding another frequency layer, and
the receiving apparatus further includes a processing section that obtains image data for display according to a display capability, using image data regarding layers from the lowermost frequency layer up to a predetermined higher frequency layer among the image data regarding the plurality of frequency layers.

(2) The receiving apparatus according to (1), in which
the processing section performs de-blending processing on the image data regarding the lowermost frequency layer in a case of obtaining the image data for display by using image data regarding higher frequency layers than the lowermost frequency layer.

(3) The receiving apparatus according to (2), in which
information regarding the blending processing is added to at least the image data regarding the lowermost frequency layer, and
the processing section performs the de-blending processing on the image data regarding the lowermost frequency layer on the basis of the information regarding the blending processing.

(4) The receiving apparatus according to (3), in which
the information regarding the blending processing includes information regarding images to be blended and information regarding blending proportions.

(5) The receiving apparatus according to any one of (1) to (4), in which
the predetermined frame frequency is four or more times higher than the frame frequency of the lowermost frequency layer, and
the image data regarding the plurality of frequency layers is obtained by hierarchically decomposing the image data at the predetermined frame frequency into three or more layers.

(6) The receiving apparatus according to (5), in which
the predetermined frame frequency includes 240 Hz, and the frame frequency of the lowermost frequency layer includes 60 Hz, and
the image data regarding the plurality of frequency layers contains image data in a 60-Hz layer, image data in a 120-Hz layer, and image data in a 240-Hz layer which are obtained by hierarchically decomposing the image data at the frame frequency of 240 Hz into three layers.

(7) The receiving apparatus according to any one of (1) to (6), in which
the image data at the predetermined frame frequency includes image data having a shutter angle of 360°.

(8) A receiving method including:
a procedure of receiving image data regarding a plurality of frequency layers obtained by hierarchically decomposing image data at a predetermined frame frequency, in which
only image data regarding a lowermost frequency layer among the image data regarding the plurality of frequency layers is subjected to blending processing using image data regarding another frequency layer, and
the receiving method further includes a procedure of obtaining image data for display according to a display capability, using image data regarding layers from the lowermost frequency layer up to a predetermined higher frequency layer among the image data regarding the plurality of frequency layers.

(9) The receiving method according to (8), in which
the procedure of obtaining the image data for display includes performing de-blending processing on the image data regarding the lowermost frequency layer in a case of obtaining the image data for display by using image data regarding higher frequency layers than the lowermost frequency layer.

(10) The receiving method according to (9), in which
information regarding the blending processing is added to at least the image data at the frame frequency of the lowermost frequency layer, and
the procedure of obtaining the image data for display includes performing the de-blending processing on the image data regarding the lowermost frequency layer on the basis of the information regarding the blending processing.

(11) The receiving method according to (10), in which
the information regarding the blending processing includes information regarding images to be blended and information regarding blending proportions.

(12) The receiving method according to any one of (8) to (11), in which
the predetermined frame frequency is four or more times higher than the frame frequency of the lowermost frequency layer, and
the image data regarding the plurality of frequency layers is obtained by hierarchically decomposing the image data at the predetermined frame frequency into three or more layers

(13) The receiving method according to (12), in which
the predetermined frame frequency includes 240 Hz, and the frame frequency of the lowermost frequency layer includes 60 Hz, and
the image data regarding the plurality of frequency layers contains image data in a 60-Hz layer, image data in a 120-Hz layer, and image data in a 240-Hz layer which are obtained by hierarchically decomposing the image data at the frame frequency of 240 Hz into three layers.

(14) The receiving method according to any one of (1) to (13), in which
the image data at the predetermined frame frequency includes image data having a shutter angle of 360°.

(15) A transmitting apparatus including:
a processing section that hierarchically decomposes image data at a predetermined frame frequency, that performs blending processing only on image data regarding a lowermost frequency layer to be blended with image data regarding another frequency layer, and that obtains image data regarding a plurality of frequency layers; and
a transmitting section that transmits the image data regarding the plurality of frequency layers.

(16) A transmitting method including:
a procedure of hierarchically decomposing image data at a predetermined frame frequency, performing blending processing only on image data regarding a lowermost frequency layer to be blended with image data regarding another frequency layer, and obtaining image data regarding a plurality of frequency layers; and
a procedure of transmitting the image data regarding the plurality of frequency layers.

The present technology has such main features that image data regarding a plurality of frequency layers obtained by hierarchically decomposing image data at a high frame rate (only image data regarding a lowermost frequency layer is subjected to blending processing using image data regarding another frequency layer) is received and that image data for display is obtained according to a display capability, using image data regarding layers from the lowermost frequency layer to a predetermined higher frequency layer, thereby making it possible to reduce motion picture quality degradation caused by strobing in a layer of a basic frame frequency and to maintain a high image quality in layers of the other frame frequencies.

REFERENCE SIGNS LIST 10, 10A: Transmitting and receiving system
100: Transmitting apparatus
101: Control section
102: Preprocessor
103: Encoder
104: Multiplexer
105: Transmitting section
200, 200A, 200B, 200C: Television receiver
200-1, 200A-1, 200B-1, 200C-1: Set-top box
200-2, 200A-2, 200B-2, 200C-2: Display
201: Control section
202: Receiving section
203: Demultiplexer
204: Decoder
205: Postprocessor
206: MCFI section
207: Panel display section

The invention claimed is:

1. A receiving apparatus comprising:
receiving circuitry configured to receive image data regarding three or more frequency layers obtained by hierarchically decomposing image data at a frame frequency that is four or more times higher than a lowest frame frequency of a lowermost frequency layer of the three or more frequency layers, wherein
only image data regarding the lowermost frequency layer among the image data regarding the three or more frequency layers is subjected to blending processing using image data regarding another frequency layer of the three or more frequency layers, and
the receiving apparatus further includes processing circuitry configured to obtain image data for display according to a capability of a display, using image data regarding layers from the lowermost frequency layer up to a higher frequency layer among the image data regarding the three or more frequency layers.

2. The receiving apparatus according to claim 1, wherein the processing circuitry is configured to perform de-blending processing on the image data regarding the lowermost frequency layer in a case of obtaining the image data for display by using image data regarding higher frequency layers than the lowermost frequency layer.

3. The receiving apparatus according to claim 2, wherein information regarding the blending processing is received with at least the image data regarding the lowermost frequency layer, and
the processing circuitry is configured to perform the de-blending processing on the image data regarding the lowermost frequency layer on a basis of the information regarding the blending processing.

4. The receiving apparatus according to claim 3, wherein the information regarding the blending processing includes information regarding blended images and information regarding blending proportions.

5. The receiving apparatus according to claim 1, wherein the frame frequency is four times higher than the lowest frame frequency of the lowermost frequency layer, and
the image data regarding the three or more frequency layers contains image data in the lowermost frequency layer, image data in a frequency layer having a frequency that is two times higher than the lowest frame frequency, and image data in a highest frequency layer.

6. The receiving apparatus according to claim 1, wherein the image data at the frame frequency includes image data having a shutter angle of 360°.

7. The receiving apparatus according to claim 1, wherein the receiving apparatus comprises the display.

8. The receiving apparatus according to claim 1, wherein the receiving apparatus is a television receiver.

9. A receiving method comprising:
receiving image data regarding three or more frequency layers obtained by hierarchically decomposing image data at a frame frequency that is four or more times higher than a lowest frame frequency of a lowermost frequency layer of the three or more frequency layers, wherein
only image data regarding the lowermost frequency layer among the image data regarding the three or more frequency layers is subjected to blending processing using image data regarding another frequency layer of the three or more frequency layers, and
the receiving method further includes obtaining image data for display according to a capability of a display, using image data regarding layers from the lowermost frequency layer up to a higher frequency layer among the image data regarding the three or more frequency layers.

10. The receiving method according to claim 9, wherein the obtaining the image data for display includes performing de-blending processing on the image data regarding the lowermost frequency layer in a case of obtaining the image data for display by using image data regarding higher frequency layers than the lowermost frequency layer.

11. The receiving method according to claim 10, wherein information regarding the blending processing is received with at least the image data at the frame frequency of the lowermost frequency layer, and
the obtaining the image data for display includes performing the de-blending processing on the image data regarding the lowermost frequency layer on a basis of the information regarding the blending processing.

12. The receiving method according to claim 11, wherein the information regarding the blending processing includes information regarding blended images and information regarding blending proportions.

13. The receiving method according to claim 9, wherein the frame frequency is four times higher than the lowest frame frequency of the lowermost frequency layer, and
the image data regarding the three or more frequency layers contains image data in the lowermost frequency layer, image data in frequency layer having a frequency that it two times higher than the lowest frame frequency, and image data in a highest frequency layer.

14. The receiving method according to claim 9, wherein the image data at the frame frequency includes image data having a shutter angle of 360°.

15. A transmitting apparatus comprising:
processing circuitry configured to:
hierarchically decompose image data at a frame frequency into three or more frequency layers, the frame frequency being four or more times higher than a lowest frame frequency of a lowermost frequency layer of the three or more frequency layers,
perform blending processing only on image data regarding the lowermost frequency layer to be blended with image data regarding another frequency layer of the three or more frequency layers, and
obtain image data regarding the three or more frequency layers; and
transmitting circuitry configured to transmit the image data regarding the three or more frequency layers.

16. A transmitting method comprising:
hierarchically decomposing image data at a frame frequency into three or more frequency layers, the frame frequency being four or more times higher than a lowest frame frequency of a lowermost frequency layer of the three or more frequency layers,
performing blending processing only on image data regarding the lowermost frequency layer to be blended with image data regarding another frequency layer of the three or more frequency layers,
obtaining image data regarding the three or more frequency layers, and
transmitting the image data regarding the three or more frequency layers.

* * * * *